(12) United States Patent
Fujiuchi et al.

(10) Patent No.: US 9,946,009 B2
(45) Date of Patent: Apr. 17, 2018

(54) LIGHT GUIDE, LIGHT SOURCE DEVICE, AND IMAGE READING DEVICE

(71) Applicant: Mitsubishi Electric Corporation, Chiyoda-ku (JP)

(72) Inventors: Akiko Fujiuchi, Chiyoda-ku (JP); Hironobu Arimoto, Chiyoda-ku (JP); Taku Matsuzawa, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/251,219

(22) Filed: Aug. 30, 2016

(65) Prior Publication Data
US 2016/0370532 A1     Dec. 22, 2016

Related U.S. Application Data

(62) Division of application No. 14/651,309, filed as application No. PCT/JP2013/083508 on Dec. 13, 2013, now Pat. No. 9,841,549.

(30) Foreign Application Priority Data

Dec. 20, 2012 (JP) ................................ 2012-278410
Mar. 7, 2013 (JP) ................................ 2013-045671

(51) Int. Cl.
*H04N 1/04* (2006.01)
*F21V 8/00* (2006.01)
(Continued)

(52) U.S. Cl.
CPC ............. *G02B 6/0045* (2013.01); *G02B 3/02* (2013.01); *G02B 6/0055* (2013.01);
(Continued)

(58) Field of Classification Search
None
See application file for complete search history.

(56) References Cited

U.S. PATENT DOCUMENTS

| 6,360,030 B1 | 3/2002 | Kawai |
| 7,953,312 B2 | 5/2011 | Kabuki |

(Continued)

FOREIGN PATENT DOCUMENTS

| CN | 101385326 A | 3/2009 |
| CN | 101634428 A | 1/2010 |

(Continued)

OTHER PUBLICATIONS

Combined Chinese Office Action and Search Report dated Jan. 5, 2017 in Chinese Patent Application No. 201380066091.2 (with partial English language translation and English translation of categories of cited documents).

(Continued)

*Primary Examiner* — Cheukfan Lee
(74) *Attorney, Agent, or Firm* — Oblon, McClelland, Maier & Neustadt, L.L.P.

(57) ABSTRACT

A light guide includes a first exit portion emitting first exiting light, a second exit portion emitting second exiting light in a different direction than the first exiting light, and a reflecting portion reflecting light entering the light guide to each of the first and second exit portions. The first and second exit portions respectively have first and second curved surfaces each having a convex cross section perpendicular to the long axis direction. The second exit portion is connected to the first exit portion in the direction perpendicular to the long axis direction. The reflecting portion is provided, in a plane facing the first exit portion and the second exit portion, at a position shifted in the direction perpendicular to the long axis direction from a position (Continued)

where a normal to the plane passes through a connection portion between the first and second exit portions.

8 Claims, 33 Drawing Sheets

(51) Int. Cl.
*H04N 1/028* (2006.01)
*G02B 3/02* (2006.01)
*G02B 19/00* (2006.01)
*G03B 15/03* (2006.01)

(52) U.S. Cl.
CPC ..... *G02B 19/0047* (2013.01); *G02B 19/0061* (2013.01); *G03B 15/03* (2013.01); *H04N 1/0284* (2013.01); *H04N 1/02825* (2013.01); *H04N 1/02835* (2013.01); *H04N 2201/0081* (2013.01)

(56) References Cited

U.S. PATENT DOCUMENTS

| 8,371,736 | B2* | 2/2013 | Inoue | G02B 6/0001 358/484 |
|---|---|---|---|---|
| 9,121,974 | B2 | 9/2015 | Tanaka | |
| 2006/0050390 | A1 | 3/2006 | Sawada | |
| 2008/0212148 | A1 | 9/2008 | Fujiuchi et al. | |
| 2009/0003784 | A1 | 1/2009 | Kabuki et al. | |
| 2009/0010020 | A1 | 1/2009 | Katsumata et al. | |
| 2009/0027915 | A1 | 1/2009 | Kaneko | |
| 2011/0085212 | A1 | 4/2011 | Sanada et al. | |
| 2011/0102862 | A1 | 5/2011 | Inoue et al. | |
| 2011/0216541 | A1 | 9/2011 | Inoue et al. | |
| 2011/0299138 | A1 | 12/2011 | Minamikawa | |
| 2014/0029256 | A1 | 1/2014 | Tanaka | |
| 2014/0355291 | A1 | 12/2014 | Okamoto | |
| 2014/0355296 | A1 | 12/2014 | Shigoku | |
| 2014/0355303 | A1 | 12/2014 | Fujiuchi | |
| 2014/0376254 | A1 | 12/2014 | Arimoto | |
| 2015/0249104 | A1* | 9/2015 | Ota | G07D 7/121 250/208.1 |

FOREIGN PATENT DOCUMENTS

| JP | 2008 216409 | 9/2008 |
|---|---|---|
| JP | 2008 219244 | 9/2008 |
| JP | 2011 71696 | 4/2011 |
| JP | 2011 101098 | 5/2011 |
| JP | 2011 182370 | 9/2011 |
| JP | 5087337 | 12/2012 |
| TW | 200420110 | 10/2004 |
| TW | 200507616 | 2/2005 |
| WO | 2007 105293 | 9/2007 |
| WO | 2007 119290 | 10/2007 |

OTHER PUBLICATIONS

Taiwanese Office Action dated Mar. 25, 2015 in Taiwanese Patent Application No. 102147128 (with English translation) (Total 12 Pages).
International Search Report dated Mar. 18, 2014 in PCT/JP2013/083508 Filed Dec. 13, 2013.
Office Action dated Apr. 26, 2016 in Japanese Patent Application No. 2014-553114 (with English language translation).
Office Action dated Mar. 30, 2017 in U.S. Appl. No. 14/651,309.
Office Action dated Dec. 20, 2016 in U.S. Appl. No. 14/651,309.
Office Action dated Jul. 12, 2017 in Chinese Application No. 201380066091.2, along with an English translation.

* cited by examiner

LIGHT GUIDE, LIGHT SOURCE DEVICE, AND IMAGE READING DEVICE

CROSS-REFERENCE TO RELATED APPLICATIONS

This application is a divisional of U.S. application Ser. No. 14/651,309, filed Jun. 11, 2015. U.S. application Ser. No. 14/651,309 is a national stage of International Application No. PCT/JP2013/083508, filed Dec. 13, 2013, and claims the benefit of priority based on Japanese Patent Application No. 2012-278410, filed on Dec. 20, 2012, and Japanese Patent Application No. 2013-045671, filed on Mar. 7, 2013, the entire disclosure of which is incorporated by reference herein.

TECHNICAL FIELD

The present disclosure relates to a light guide for emitting light in two directions, a light source device using the light guide, and an image reading device using the light guide.

BACKGROUND ART

Light source devices for use in image reading devices and the like are used in facsimile machines, multifunctional devices, or devices for reading valuable papers and the like. Such an image reading device irradiates a document or paper to be read with light from a light source device in multiple directions. Light reflected by or transmitted through such an object to be read is imaged by the image reading device through an imaging element such as a lens and a mirror onto a photoelectric conversion element such as a complementary metal-oxide semiconductor (CMOS) sensor and a charge-coupled device (CCD) sensor to detect optical information of the object to be read. The image reading device utilizes the obtained image information for copying of documents, authenticity check of paper currency, check of level of degradation due to distribution, or the like. The reduced size of image reading devices and increased reading speed in recent years require that the light source devices become miniaturized and highly efficient.

Some conventional light source devices requiring such irradiation in multiple directions are as follows. For example, Patent Literature 1 describes an image reading device that irradiates an object to be read with light in multiple directions using a single light guide and a mirror.

Patent Literature 2 discloses a bifurcated light guide obtained from a single light guide by disposing light diverting surfaces in multiple positions of the single light guide in such a way that the vertical planes extending in the longitudinal direction of the light diverting surfaces intersect (see FIG. 2). Patent Literature 2 also discloses a light guide having one light diverting surface and two exit portions (portions having faces from which light exits) (see FIG. 10).

Patent Literature 3 discloses a light source device used for document reading, the light source device including a linear light source, a rod-shaped lens arranged in parallel to the linear light source, and a linear reflector arranged, at the opposite side of the rod-shaped lens from the linear light source, in parallel to the rod-shaped lens at a position to intersect a second optical axis plane of the rod-shaped lens. The rod-shaped lens has a first optical axis plane containing optical axes passing through a first linear focal point group containing first focal points and a second optical axis plane containing optical axes passing through a second linear focal point group containing second focal points. The first linear focal point group and the second linear focal point group are located in the vicinity of the position where the second optical axis plane of light reflected by the linear reflector intersects the first optical axis plane.

CITATION LIST

Patent Literature

Patent Literature 1: Unexamined Japanese Patent Application Kokai Publication No. 2008-219244
Patent Literature 2: Unexamined Japanese Patent Application Kokai Publication No. 2008-216409
Patent Literature 3: Japanese Patent No. 5087337

SUMMARY OF INVENTION

Technical Problem

However, both of the light guides disclosed in Patent Literatures 1 and 2 are arranged so that the light diverting surfaces of the light guides intersect, thus causing difficulty due to complicated manufacturing processes.

In the light guide disclosed in Patent Literature the light diverting surface is arranged over the entire surface, as illustrated in FIG. 10 of Patent Literature 2. There is thus a problem of occurrence of light exiting from the boundary area between the exit portions 5a and 5b, that is, stray light exiting in a direction other than the intended directions. In addition, the smaller cross section of the light guide reduces the size of an entry surface 2, thus causing a problem of poor matching with a high brightness light source having a large light emitting surface.

In the light source device used for document reading disclosed in Patent Literature 3, the first and second linear focal point groups are located in the vicinity of the position where the second optical axis plane of light reflected by the linear reflector intersects the first optical axis plane. This leads to equal amounts of light of the first and second optical axes, thereby causing a problem that the illuminance of light for irradiating the document surface with light having a longer path length along the second optical axis differs from the illuminance of light for irradiating the document surface with light along the first optical axis.

The present disclosure is made to solve the problems described above, and an objective of the present disclosure is to obtain a bidirectional light emitting light guide that is compact and simple to assemble and has a high illumination efficiency, a light source device using the light guide, and an image reading device using the light guide.

Solution to Problem

To achieve the foregoing objective, according to a first aspect of the present disclosure, a light guide extending in a long axis direction and having an end in the long axis direction from which light enters the light guide, includes a first exit portion for emitting first exiting light, a second exit portion for emitting second exiting light in a direction different from a direction of the first exiting light, a reflecting portion for reflecting light entering the light guide to each of the first exit portion and the second exit portion.

The first exit portion has a first curved surface having a convex cross section perpendicular to the long axis direction. The second exit portion has a second curved surface having a convex cross section perpendicular to the long axis direction. The second exit portion is connected through a connection portion to the first exit portion to form a concave shape in the direction perpendicular to the long axis direction.

The reflecting portion is disposed, in a plane portion facing both of the first exit portion and the second exit portion, at a position that is shifted in the direction perpendicular to the long axis direction from a position where a normal to the plane passes through a connection portion and intersects the plane portion, the connection portion connecting the first exit portion and the second exit portion to form a concave shape.

According to a second aspect of the present disclosure, a light guide extending in a long axis direction and having an end in the long axis direction from which light enters the light guide, includes a first exit portion for emitting first exiting it, a second exit portion for emitting second exiting light in a direction different from a direction of the first exiting light, a first reflecting portion, and a second reflecting portion.

The first exit portion has a first curved surface having a convex cross section perpendicular to the long axis direction. The second exit portion has a second curved surface having a convex cross section perpendicular to the long axis direction. The second exit portion is connected to the first exit portion in the direction perpendicular to the long axis direction.

The first reflecting portion is disposed in a first plane portion facing the first exit portion. The second reflecting portion is disposed in a second plane portion facing the second exit portion.

A distance between the first exit portion and the first reflecting portion is shorter that a distance between the second exit portion and the second reflecting portion.

The first exit portion and the second exit portion are connected to form a concave shape therebetween in a cross section perpendicular to the long axis direction.

According to a third aspect of the present disclosure, a light guide extending in a long axis direction and having an end in the long axis direction from which light enters the light guide, includes a first exit portion for emitting first exiting light, a second exit portion for emitting second exiting light in a direction different from a direction of the first exiting light, a first reflecting portion, and a second reflecting portion.

The first exit portion has a first curved surface having a convex cross section perpendicular to the long axis direction. The second exit portion has a second curved surface having a convex cross section perpendicular to the long axis direction. The second exit portion is connected to the first exit portion in the direction perpendicular to the long axis direction.

The first reflecting portion is disposed in a first plane portion facing the first exit portion. The second reflecting portion is disposed in a second plane portion facing the second exit portion.

A distance between the first exit portion and the first reflecting portion is shorter than a distance between the second exit portion and the second reflecting portion.

An optical axis of the first exiting light intersects an optical axis of the second exiting light.

The first curved surface and the second curved surface have a same curvature.

According to a fourth aspect of the present disclosure, a light guide extending in a long axis direction and having an end in the long axis direction from which light enters the light guide, includes a first exit portion for emitting first exiting light, a second exit portion for emitting second exiting light in a direction different from a direction of the first exiting light, a first reflecting portion, a second reflecting portion, and at least one recess.

The first exit portion has a first curved surface having a convex cross section perpendicular to the long axis direction. The second exit portion has a second curved surface having a convex cross section perpendicular to the long axis direction. The second exit portion is connected to the first exit portion in the direction perpendicular to the long axis direction.

The first reflecting portion is disposed in a first plane portion facing the first exit portion. The second reflecting portion is disposed in a second plane portion facing the second exit portion.

The at least one recess extends in the long axis direction and is disposed in one or both of positions between the first exit portion and the second reflecting portion and between the second exit portion and the first reflecting portion.

The at least one recess is formed by planes extending in the long axis direction and intersecting each other.

The at least one recess is formed by a plane parallel to an optical axis of the first exiting light and by a plane intersecting the plane parallel to the optical axis of the first exiting light.

According to a fifth aspect of the present disclosure, a light guide extending in a long axis direction and having an end in the long axis direction from which light enters the light guide, includes a first exit portion for emitting first exiting light, a second exit portion for emitting d exiting light in a direction different from a direction of the first exiting light, a first reflecting portion, a second reflecting portion, and at least one recess.

The first exit portion has a first curved surface having a convex cross section perpendicular to the long axis direction. The second exit portion has a second curved surface having a convex cross section perpendicular to the long axis direction. The second exit portion is connected to the first exit portion in the direction perpendicular to the long axis direction.

The first reflecting portion is disposed in a first plane portion facing the first exit portion. The second reflecting portion is disposed in a second plane portion facing the second exit portion.

The at least one recess extends in the long axis direction and is disposed in one or both of positions between the first exit portion and the second reflecting portion and between the second exit portion and the first reflecting portion.

The at least one recess is formed by planes extending in the long axis direction and intersecting each other.

The recess disposed between the first exit portion and the second reflecting portion is formed by a plane parallel to an optical axis of the first exiting light and by a plane intersecting the plane parallel to the optical axis of the first existing light.

The recess disposed between the second exit portion and the first reflecting portion is formed by a plane parallel to an optical axis of the second exiting light and by a plane intersecting the plane parallel to the optical axis of the second exiting light.

According to a sixth aspect of the present disclosure, a light source device includes the light guide according to any one of the first to fifth aspects, and a reflector facing the first exit portion of the light guide and extending in the long axis direction. The light guide irradiates an object to be irradiated with a second exiting light. The reflector irradiates the object to be irradiated by reflecting the first exiting light from the light guide.

According to a seventh aspect of the present disclosure, an image reading device includes the light source device according to the sixth aspect includes imaging optical system for focusing scattered light, the scattered light being the second exiting light and the light reflected by the reflector that are reflected on the object to be irradiated, and a light receiver for receiving the light focused by the imaging optical system.

According to an eighth aspect of the present disclosure, an image reading device includes the light guide according to any one of the first to fifth aspects, for irradiating the object to be irradiated with each of the first exiting light and the second exiting light, imaging optical system for focusing scattered light, the scattered light being the first exiting light and the second exiting light from the light guide that are reflected on the object to be irradiated, and a light receiver for receiving the light focused by the imaging optical system.

Advantageous Effects of Invention

According to the present disclosure, a bidirectional light emitting light guide that is compact and simple to assemble and has a high illumination efficiency, a light source device using the light guide, and an image reading device using the light guide, can be obtained.

DESCRIPTION OF EMBODIMENTS

First Embodiment

The structure and operation of a light guide according to a first embodiment of the present disclosure are described with reference to FIGS. 1 to 4.

Figure 1:
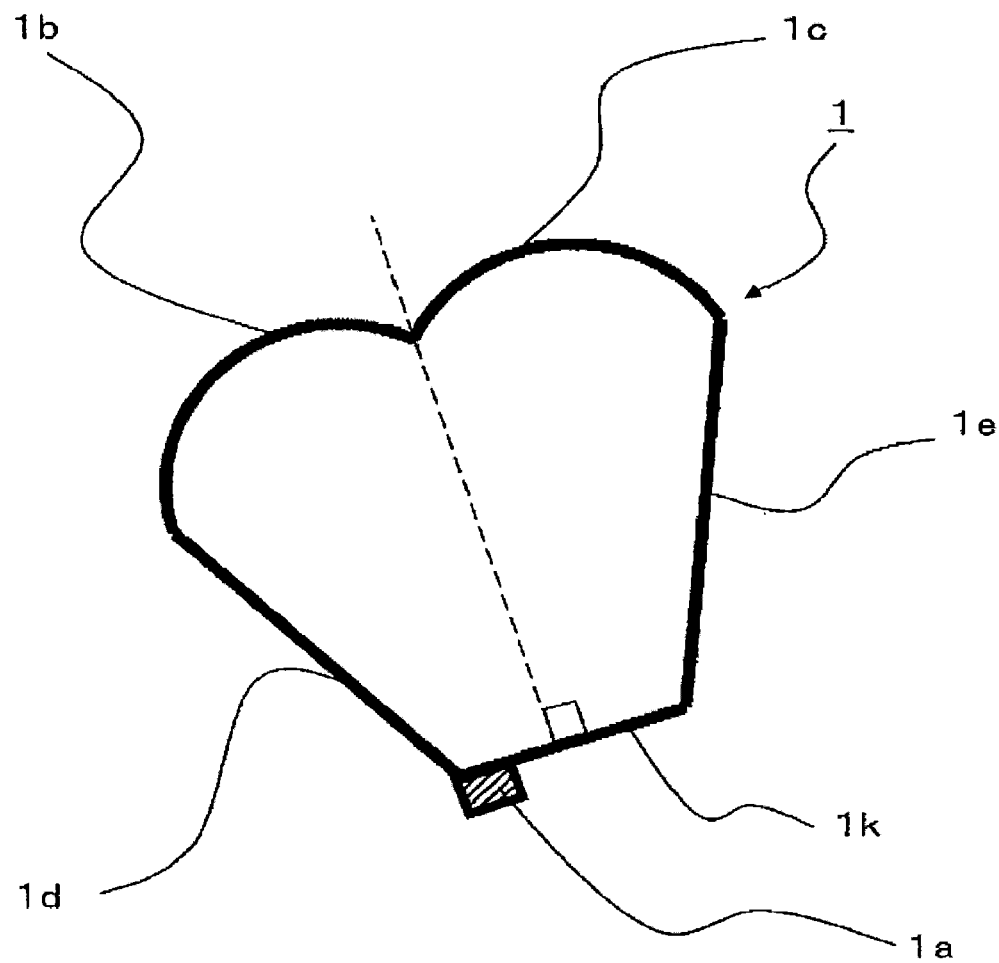
FIG. 1 is a cross-sectional view of a light guide according to a first embodiment of the present disclosure.
Figure 2:
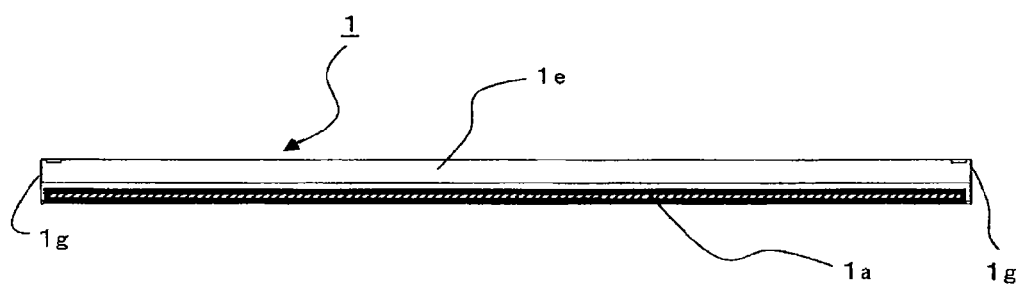
FIG. 2 is a top view as seen from a light diverting surface side of the light guide according to the first embodiment.
Figure 3:
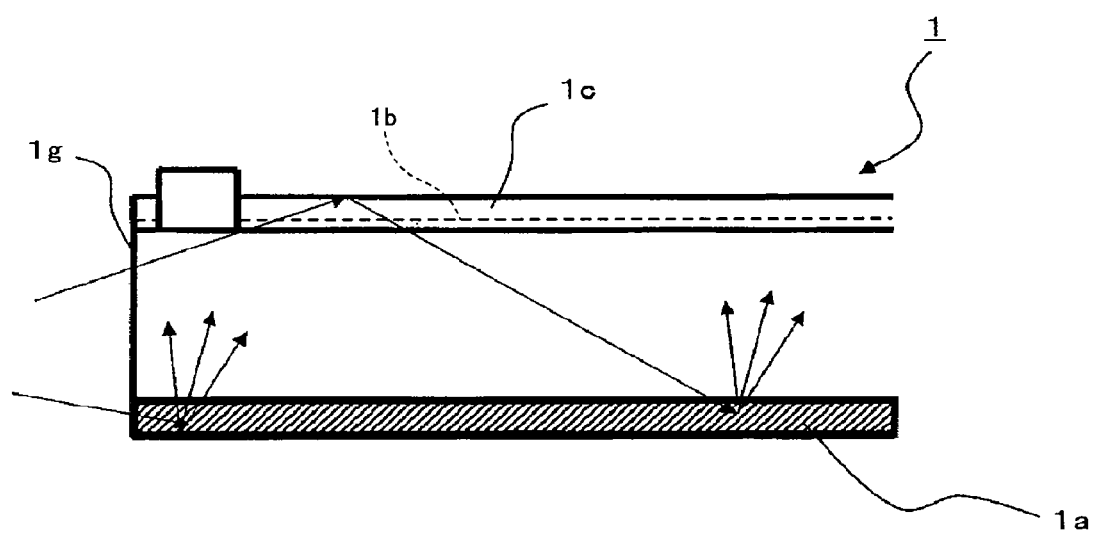
FIG. 3 is a diagram illustrating an optical path in the longitudinal cross section of the light guide according to the first embodiment.
Figure 4:
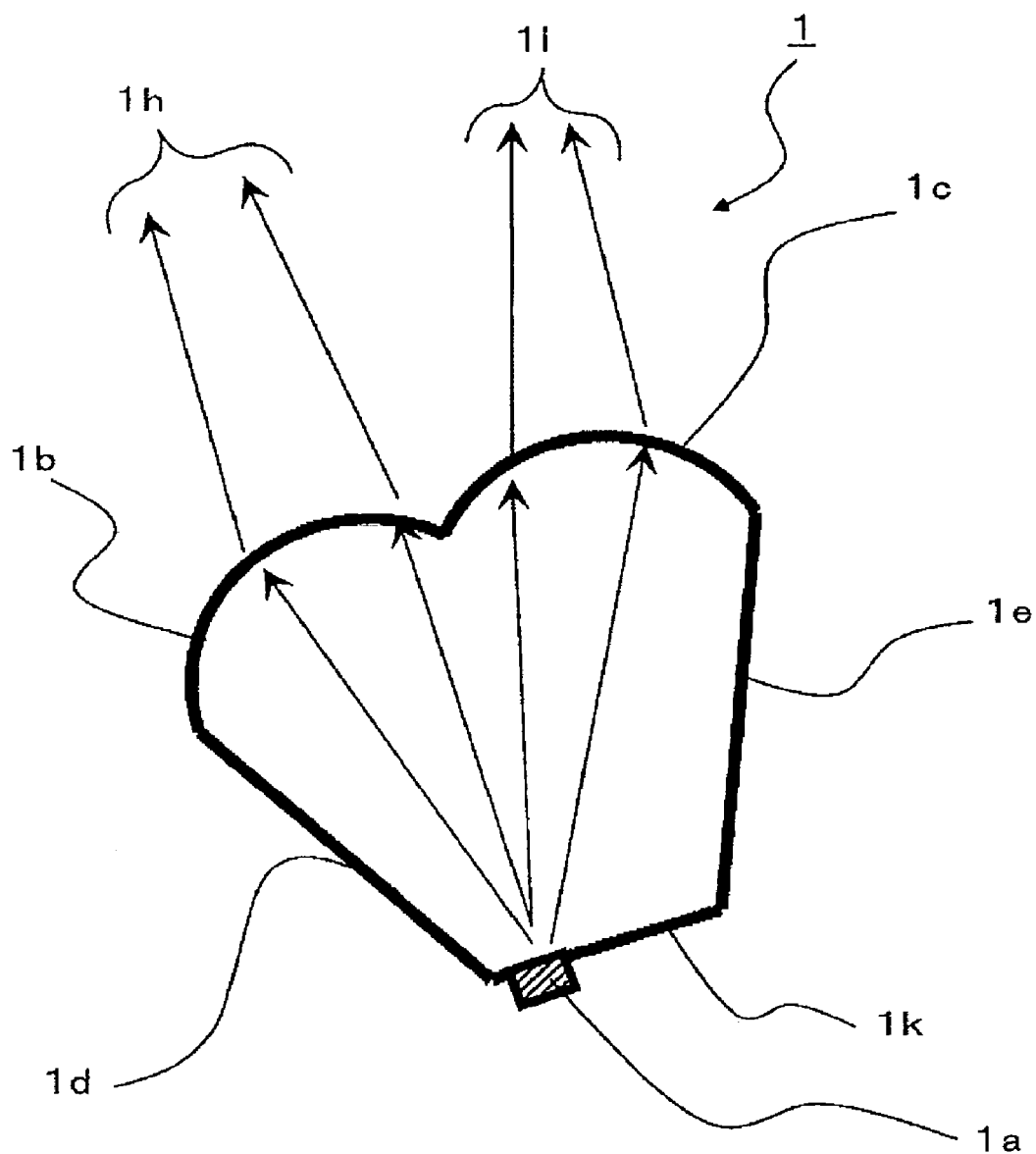
FIG. 4 is a diagram illustrating an optical path in the transverse cross section of the light guide according to the first embodiment.

FIG. 1 is a cross-sectional view of the light guide according to the first embodiment of the present disclosure. FIG. 2 is a top view as seen from a light diverting surface side of the light guide according to the first embodiment of the present disclosure. FIG. 3 is a diagram illustrating an optical path (path of light) in the longitudinal (hereinafter also referred to as "long axis direction") cross section of the light guide according to the first embodiment of the present disclosure. FIG. 4 is a diagram illustrating an optical path in the transverse cross section of the light guide according to the first embodiment of the present disclosure. As used herein, "transverse" direction refers to any one of the directions perpendicular to the long axis direction (longitudinal direction), and so forth.

The light guide 1 according to the present embodiment extends in the long axis direction, and incident light enters the light guide 1 from an entry portion disposed at the long axis direction end thereof. The light guide 1 includes a light diverting surface (reflecting portion) 1a for reflecting light entering the light guide 1, an exit portion (first exit portion) 1b for emitting primary light (first exiting light) 1h, and an exit portion (second exit portion) 1c for emitting secondary light (second exiting light) 1i in a direction different from the direction of the primary light (first exiting light) 1h.

The exit portion 1b has a first curved surface (first exit surface) having a convex cross section perpendicular to the long axis direction. The exit portion 1c continues (connects) to the exit portion 1b in the direction perpendicular to the long axis direction and has a second curved surface (second exit surface) having a convex cross section perpendicular to the long axis direction.

The light diverting surface 1a is disposed at the point of intersection between optical axes of primary light 1h and secondary light 1i. The light diverting surface 1a reflects light entering the light guide 1 to each of the exit portions 1b and 1c. This light diverting surface 1a diverts (splits) light entering the light guide 1 into primary light 1h and secondary light 1i.

The exit portions 1b and 1c are connected at a linear common connection portion (connection portion) extending in the longitudinal direction. The exit portions 1b and 1c connected at the common connection portion to form a concave shape therebetween in the transverse cross section.

The light diverting surface 1a is disposed in a plane facing the exit portions 1b and 1c. The light diverting surface 1a is displaced (shifted) from a line vertical to the plane and passing through the common connection portion to the exit portion (first exit portion) 1b in the direction perpendicular to the long axis direction. More specifically, the light diverting surface 1a is disposed, in the plane facing the first exit portion 1b and the second exit portion 1c, at a position that is shifted in the direction perpendicular to the long axis direction from a position where the normal to the plane passes through the common connection portion between the first exit portion 1b and the second exit portion 1c.

The light guide 1 is a rod-shaped member formed of a transparent resin and extending in the longitudinal direction. The profile of the light guide 1 according to the present embodiment, in the cross section perpendicular to the longitudinal direction, is composed of three straight lines and two curved lines (see FIG. 1).

Specifically, the light guide 1 according to the present embodiment has, along the entire longitudinal extent, the light diverting surface 1a, the exit portions 1b and 1c having curved surfaces, a bottom surface provided with the light diverting surface 1a, a side surface 1d connecting the bottom surface and the exit portion 1b, and a side surface 1e connecting the bottom surface and the curved exit portion 1c.

The light diverting surface 1a has a white printed pattern or uneven shape formed along the longitudinal direction of the light guide 1. When a normal is drawn from a longitudinally-extending linear recess (common connection portion), which forms a boundary line between the exit portions 1b and 1c, to the bottom surface provided with the light diverting surface 1a, the light diverting surface 1a is located at the exit portion 1b side with respect to the normal and is displaced (shifted) so that the light diverting surface 1a does not exist at the exit portion 1c side.

As illustrated in FIG. 3, light entering the light guide 1 from an entry surface 1g disposed at the longitudinal end thereof travels longitudinally while being reflected on the wall surface of the light guide 1 repeatedly. A portion of longitudinally traveling light is incident on the light diverting surface 1a. The portion of light incident on the light diverting surface 1a is reflected and thus emitted from the exit portion 1b facing the light diverting surface 1a as linear primary light 1h extending in the longitudinal direction. The portion of light incident on the light diverting surface 1a exits from the exit portion 1c as linear secondary light 1i extending in the longitudinal direction. In this way, a single light guide emits light in two directions. Light not incident on the light diverting surface 1a is guided within the light guide 1 longitudinally and exits from the other entry surface 1g at the end opposite to the entry surface 1g.

As illustrated in FIG. 4, light reflected by the light diverting surface 1a is incident on the exit portions 1b and 1c and is focused at an orientation angle by the curved surfaces of the exit portions 1b and 1c. As described above, the light diverting surface 1a has a white printed pattern or uneven shape formed along the longitudinal direction of the light guide 1. In addition, when a normal is drawn from a longitudinally-extending linear recess, which forms a boundary line between the exit portions 1b and 1c, to the bottom surface, the light diverting surface 1a is located at the exit portion 1b side of the bottom surface with respect to the normal and does not exist at the exit portion 1c side. Therefore, the light intensity of primary light 1h is sufficiently higher than the light intensity of secondary light 1i. The orientation angles of primary light 1h and secondary light 1i can be controlled at an angle according to the respective shapes of the exit portions 1b and 1c. The bottom surface 1k of the light guide 1 except for the light diverting surface 1a serves as a light guiding surface for guiding light therein longitudinally by reflection, similarly to the other surfaces of the light guide 1. The bottom surface 1k and the side surfaces 1d and 1e of the light guide 1 are planar, which enables easy mechanical assembly.

A conventional example is described hereinafter to illustrate the effects of the light guide 1 according to the first embodiment of the present disclosure.

Figure 5:
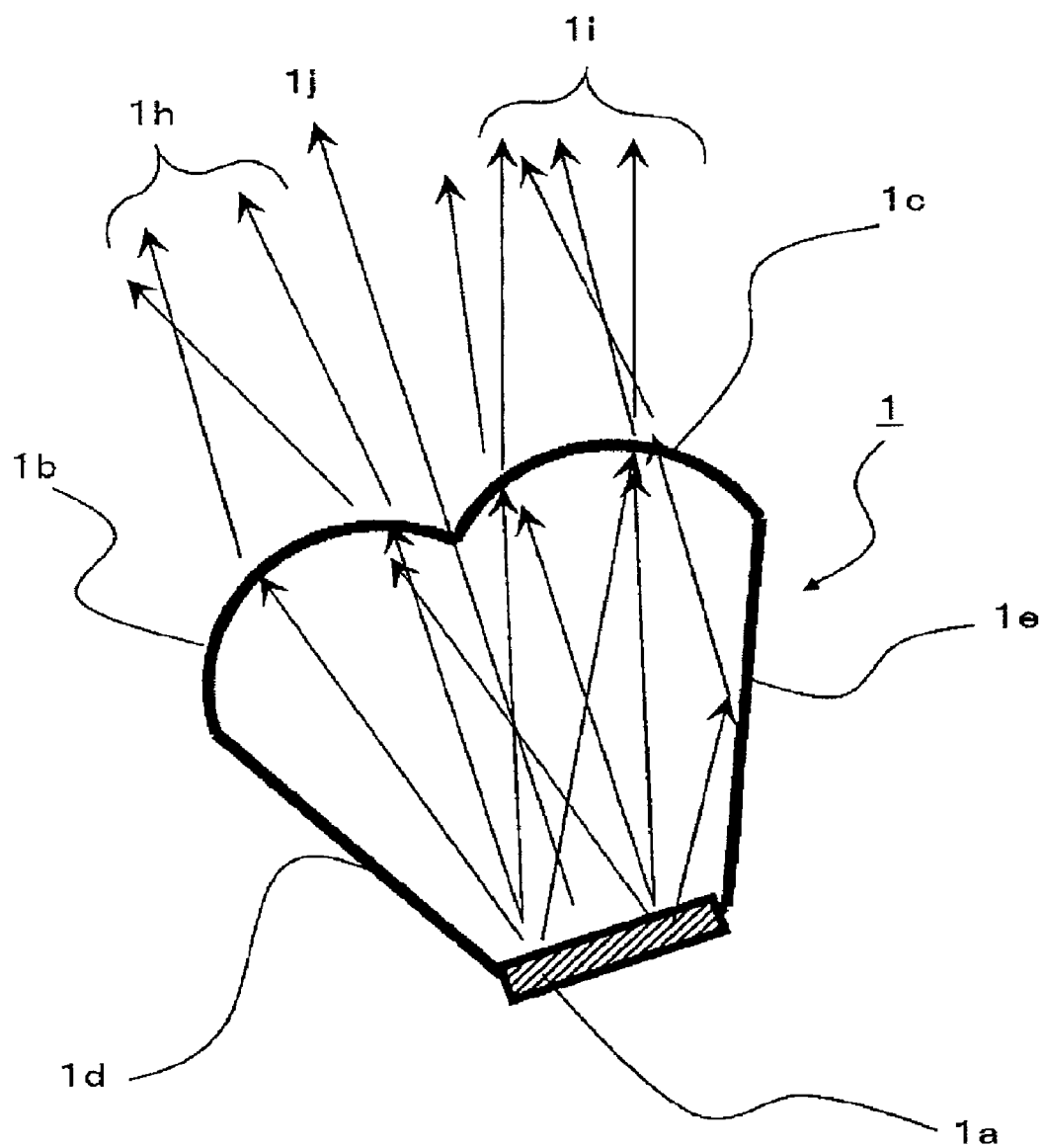
FIG. 5 is a diagram illustrating an optical path in the transverse cross section of a light guide having a conventional configuration.

FIG. 5 illustrates an optical path in the transverse cross section of a light guide having a conventional configuration. In this drawing, the light diverting surface 1a is provided across the entire bottom surface. Thus when a normal is drawn from a linear recess, which forms a boundary line between the exit portions 1b and 1c, to the bottom surface, unintended light emission is caused by reflection on the light diverting portion 1a except for a portion positioned at the exit portion 1b side with respect to the normal, that is, by reflection on the light diverting portion 1a in a portion positioned at the exit portion 1c side with respect to the normal and a portion corresponding to the boundary line between the exit portions 1b and 1c are provided with the light diverting surface 1a. A problem of increased secondary light 1i thereby arises.

In addition, the light diverting surface 1a is wide in the transverse direction, thus causing exiting light to contain light in various directions. This results in a problem of a wider orientation angles. Furthermore, light from the light diverting surface 1a that is positioned on the normal drawn from the boundary line between the exit portions 1b and 1c to the bottom surface becomes stray light exiting from the boundary line between the exit portions 1b and 1c, which causes difficulties in obtaining light in two intended directions only.

The light guide 1 according to the present embodiment can eliminate or reduce unintended light emission. As a result, light split into two intended directions can be obtained.

Second Embodiment

The structure and operation of a light guide according to a second embodiment of the present disclosure are described with reference to FIGS. 6 to 8.

Figure 6:
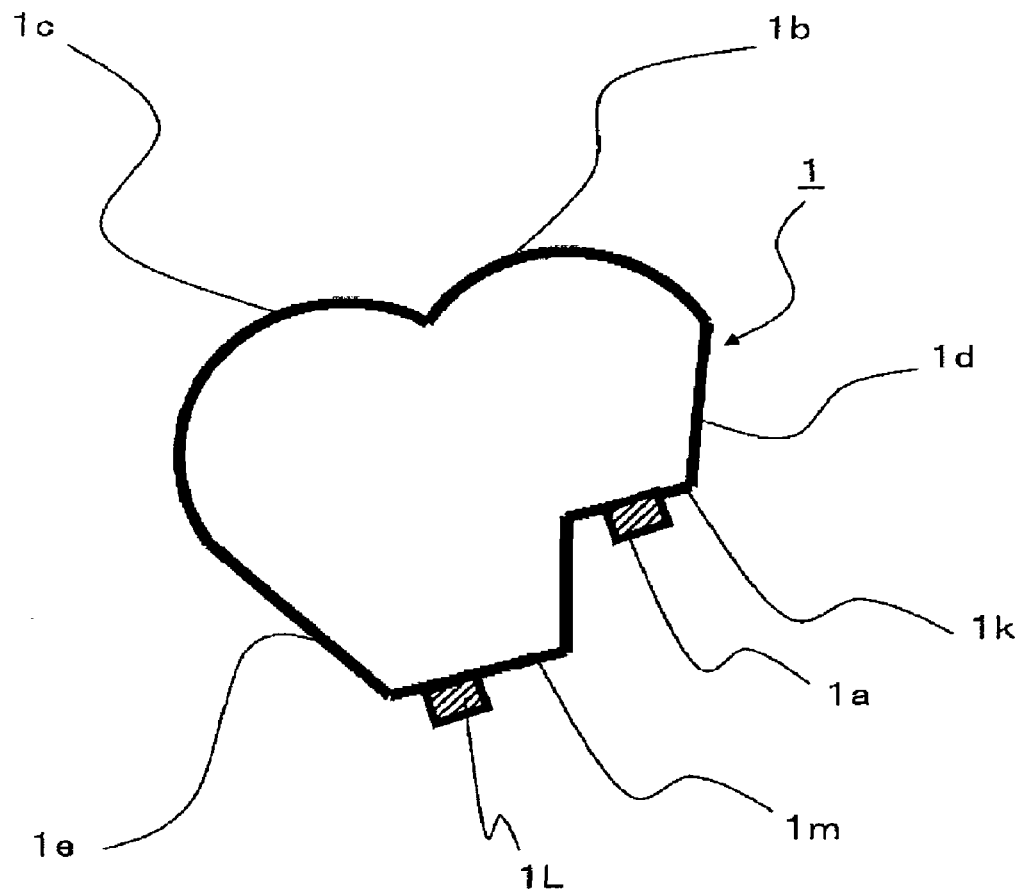
FIG. 6 is a cross-sectional view of a light guide according to a second embodiment of the present disclosure.
Figure 7:
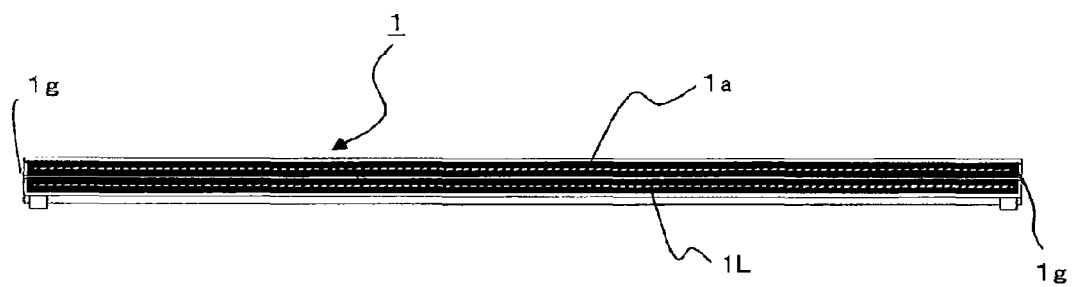
FIG. 7 is a top view as seen from a light diverting surface side of the light guide according to the second embodiment.

FIG. 6 is a cross-sectional view of the light guide according to the second embodiment of the present disclosure. FIG. 7 is a top view as seen from a light diverting surface side of the light guide according to the second embodiment of the present disclosure. FIG. 8 is a diagram illustrating an optical path in the transverse cross section of the light guide according to the second embodiment of the present disclosure. In FIGS. 6 to 8, same reference signs denote the same or similar components to those in FIGS. 1 to 4, and further descriptions thereof are omitted here.

The light guide 1 according to the present embodiment includes a light diverting surface 1L in addition to the configuration of the light guide 1 according to the first embodiment. A light diverting surface 1a as a first reflecting portion is provided on a bottom surface (plane) 1k facing an exit portion (first exit portion) 1b. A light diverting surface 1L as a second reflecting portion is provided on a bottom surface (plane) 1m facing an exit portion (second exit portion) 1c. The distance between the exit portion 1b and the light diverting surface 1a is shorter than the distance between the exit portion 1c and the light diverting surface 1L. The exit portions 1b and 1c are connected at a common connection portion to form a concave shape in the cross section perpendicular to the longitudinal direction of the light guide 1 (see FIG. 6). The light diverting surfaces 1a and 1L are arranged in parallel in a direction perpendicular to the longitudinal direction of the light guide 1 (see FIG. 7).

The light guide 1 is a rod-shaped member formed of a transparent resin and extending in the longitudinal direction. The profile of the light guide 1 according to the present embodiment, in the cross section perpendicular to the longitudinal direction, is composed of five straight lines and two curved lines (see FIG. 6).

Specifically, the light guide 1 according to the present embodiment has, along the entire longitudinal extent, the light diverting surface 1a, the exit portions 1b and 1c having curved surfaces, a bottom surface 1k provided with the light diverting surface 1a, a side surface 1d connecting the bottom surface 1k and the exit portion 1b, a bottom surface 1m provided with the light diverting surface 1L, a side surface 1e connecting the bottom surface 1m and the exit portion 1c, and a side surface connecting the bottom surfaces 1k and 1m.

The light diverting surface 1a has a white printed pattern or uneven shape formed along the longitudinal direction of the light guide 1 and faces the exit portion 1b. The light diverting surface 1L has a white printed pattern or uneven shape formed along the longitudinal direction of the light guide 1 and faces the exit portion 1c, and the bottom surfaces 1k and 1m are parallel to each other. The distance between the exit portion 1b and the light diverting surface 1a is shorter than the distance between the exit portion 1c and the light diverting surface 1L. The light diverting surfaces 1a and 1L are arranged in parallel in a direction perpendicular to the longitudinal direction of the light guide 1 (see FIG. 7).

Figure 8:
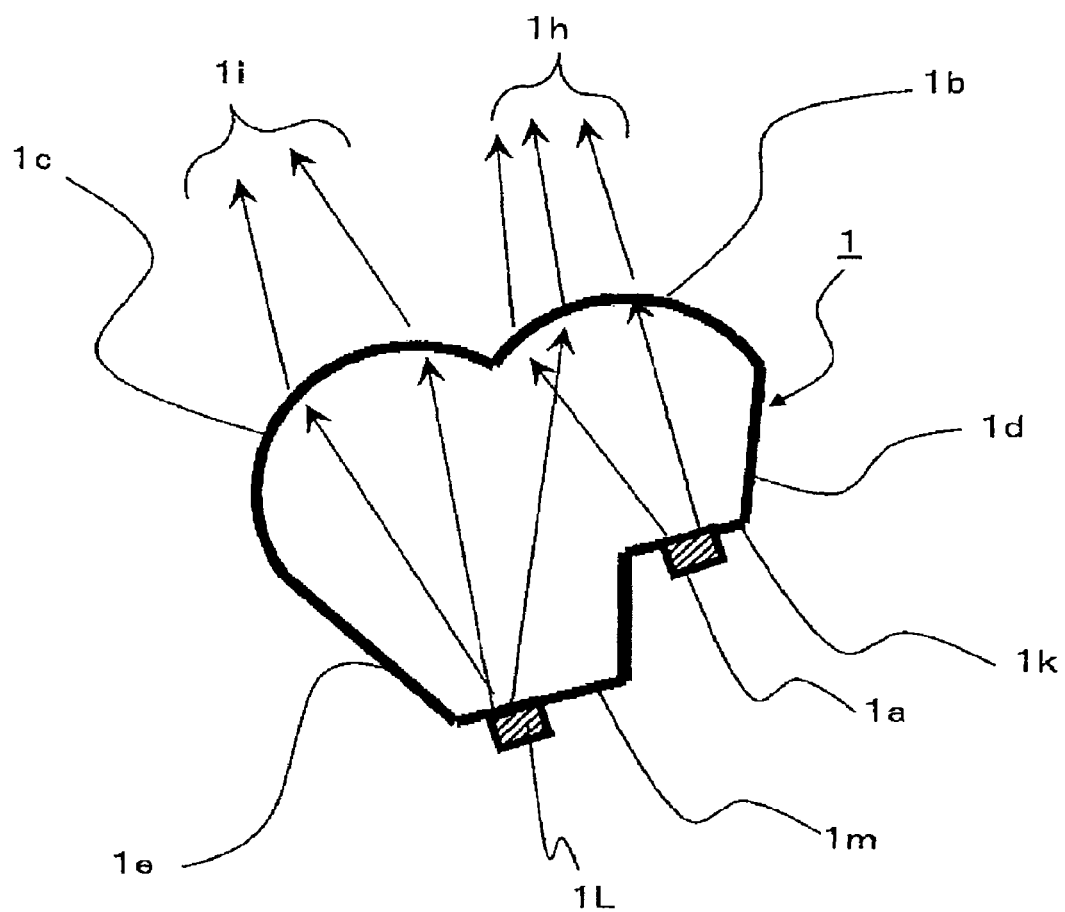
FIG. 8 is a diagram illustrating an optical path in the transverse cross section of the light guide according to the second embodiment.

As illustrated in FIG. 8, light reflected by the light diverting surface 1L is incident on the exit portions 1b and 1c and is focused at an orientation angle by the curved surfaces of the exit portions 1b and 1c. Light reflected by the light diverting surface 1a is incident on the exit portion 1b and is focused at an orientation angle by the curved surface of the exit portion 1b. That is, since the distance between the exit portion 1b and the light diverting surface 1a is shorter than the distance between the exit portion 1c and the light diverting surface 1L, light reflected by the light diverting surface 1L is incident on the exit portions 1b and 1c, but light reflected by the light diverting surface 1a is not incident on the exit portion 1c.

Therefore, the light intensity of primary light 1h is sufficiently higher than the light intensity of secondary light 1i. The light diverting surfaces 1a and 1L each have a white printed pattern or uneven shape formed along the longitudinal direction of the light guide 1. The orientation angles of primary light 1h and secondary light 1i can be controlled at an angle according to the respective shapes of the exit portions 1b and 1c. The bottom surfaces 1k and 1m of the light guide 1, except for the light diverting surfaces 1a and 1L, serve as light guiding surfaces similarly to the other surfaces of the light guide 1. The bottom surfaces and the side surfaces 1d and 1e of the light guide 1 are planar, which enables easy mechanical assembly.

The light guide 1 according to the present embodiment enables the single light guide 1 to emit light in two directions.

Third Embodiment

The structure and operation of a light guide according to a third embodiment of the present disclosure are described with reference to FIGS. 9 and 10.

Figure 9:
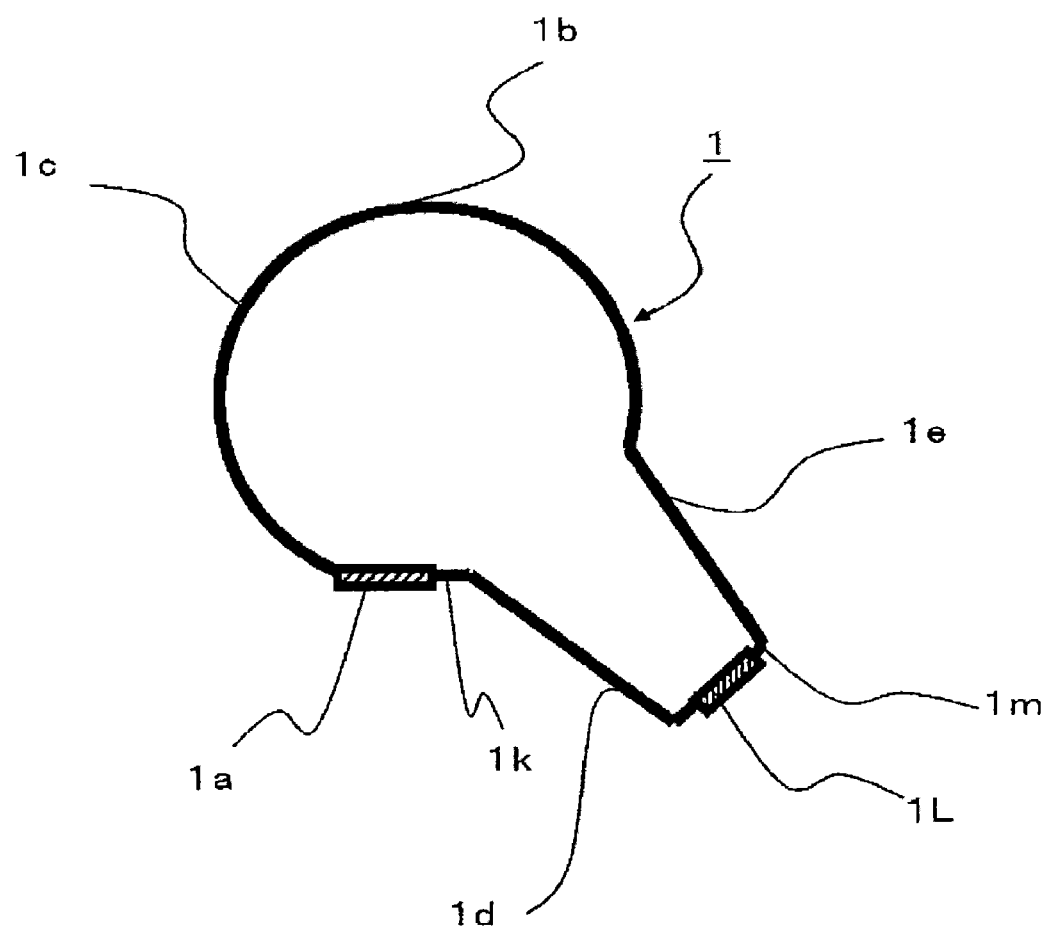
FIG. 9 is a cross-sectional view of a light guide according to a third embodiment of the present disclosure.

FIG. 9 is a cross-sectional view of a light guide according to a third embodiment of the present disclosure. FIG. 10 is a diagram illustrating an optical path in the transverse cross section of the light guide according to the third embodiment of the present disclosure. In FIGS. 9 and 10, same reference signs denote the same or similar components to those in FIGS. 6 to 8, and further descriptions thereof are omitted here.

The light guide 1 is a rod-shaped member formed of a transparent resin and extending in the longitudinal direction. The light guide 1 according to the present embodiment has a profile in a cross section perpendicular to the longitudinal direction, or a transverse profile, composed of five straight lines and two curved lines (see FIG. 9).

Specifically, the light guide 1 according to the present embodiment has a bottom surface 1k having a light diverting surface 1a extending along the entire longitudinal extent and a bottom surface 1m having a light diverting surface 1L extending along the entire longitudinal extent. The bottom surface 1m is positioned outside a round-shaped light guide. The bottom surfaces 1k and 1m connect smoothly through a side surface 1d. An exit portion 1b and the bottom surface 1m connect smoothly through a side surface 1e. That is, the light diverting surfaces 1a and 1L have respective normals pointing in different directions (see FIG. 9). The cross section perpendicular to the longitudinal direction of the light guide 1 has a convex shape projecting outward from a round shape by the side surfaces 1d and 1e and the bottom surface 1m.

The light diverting surface 1a has a white printed pattern or uneven shape formed along the longitudinal direction of the light guide 1 and is positioned at the outer periphery of the round part in the cross section perpendicular to the longitudinal direction. A first curved surface of the exit portion 1b and a second curved surface of the exit portion 1c have the same curvature, and the exit portions 1b and 1c form a smooth continuous curved surface. The distance between the exit portion 1b and the light diverting surface 1a is shorter than the distance between the exit portion 1c and the light diverting surface 1L.

Figure 10:
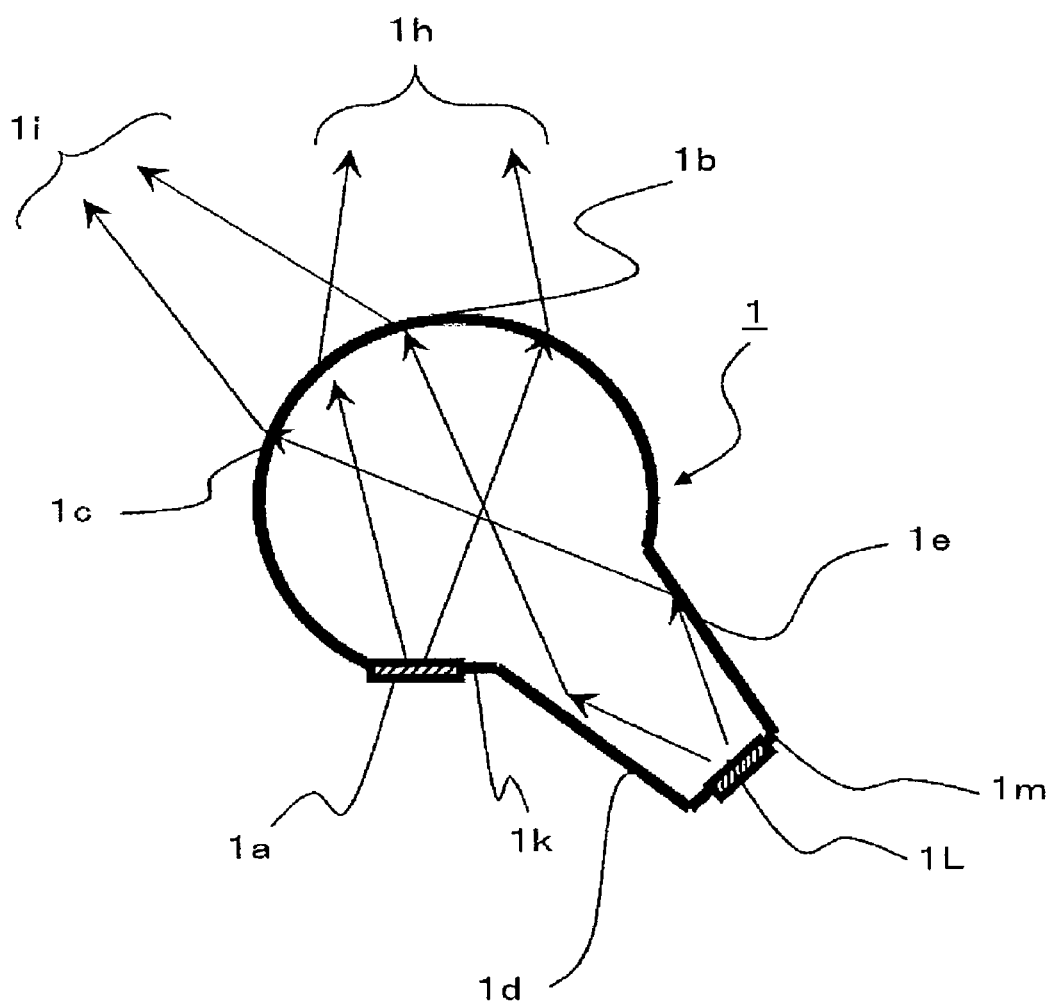
FIG. 10 is a diagram illustrating an optical path in the transverse cross section of the light guide according to the third embodiment.

As illustrated in FIG. 10, light reflected by the light diverting surface 1a is focused at an orientation angle by the exit portion 1b, whereas light reflected by the light diverting surface 1L is focused at an orientation angle by the exit portion 1c. The optical axis of primary light 1h exiting from the exit portion 1b intersects the optical axis of secondary light 1i emitted from the exit portion 1c.

As described above, the light diverting surface 1L is positioned, in the cross section perpendicular to the longitudinal direction, at the tip of a convex shaped portion formed from a part of the circular shape of the light guide 1, and has a white printed pattern or uneven shape formed along the longitudinal direction.

The bottom surface 1m projects sufficiently from the circular-shaped portion in the cross section perpendicular to the longitudinal direction. Thus the direction of light can be controlled due to the reflection on the side surfaces 1d and 1e.

The light guide 1 according to the present embodiment enables the single light guide to emit light in two directions.

In addition, the distance from the light diverting surface 1a to the exit portion 1b is shorter than the distance from the light diverting surface 1L to the exit portion 1c. Therefore, the amount of primary light 1h emitted from the exit portion 1b is greater than the amount of secondary light 1i emitted from the exit portion 1c.

Fourth Embodiment

Figure 11:
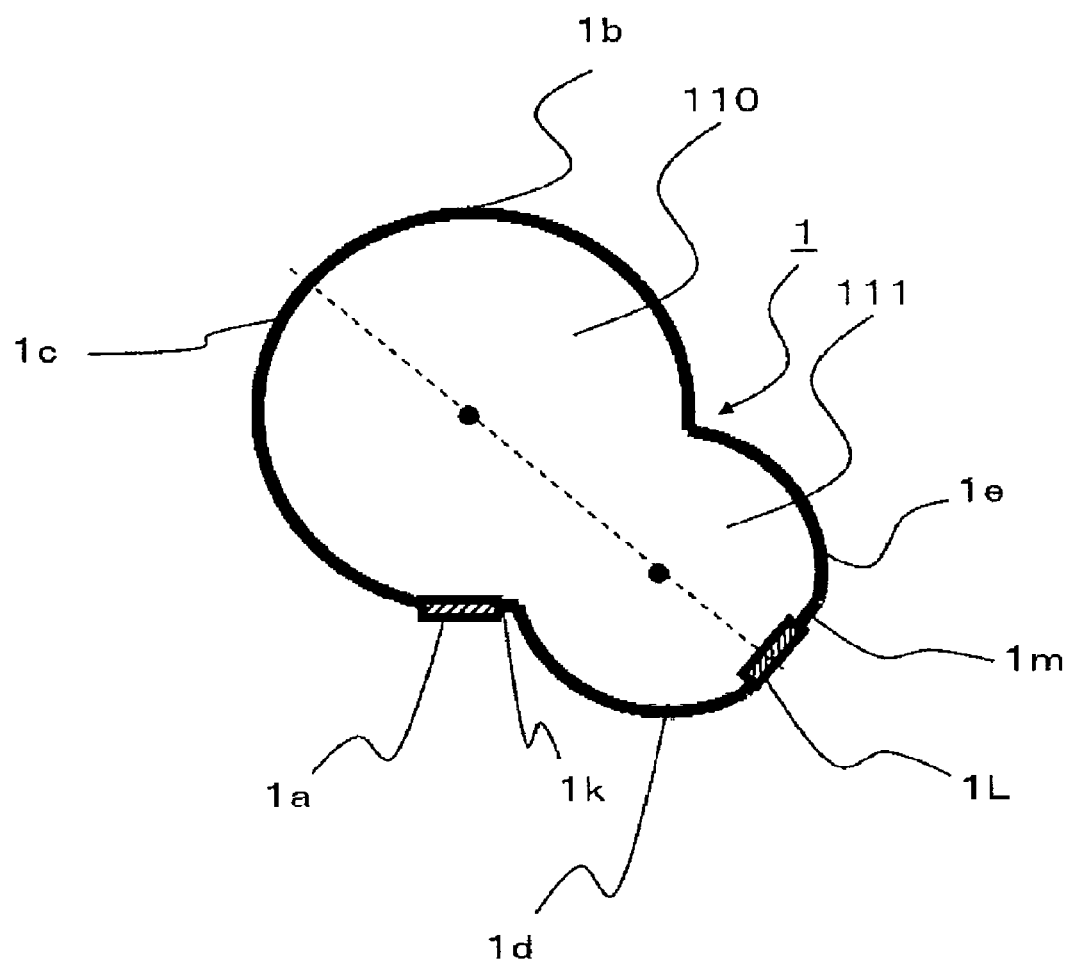
FIG. 11 is a cross-sectional view of a light guide according to a fourth embodiment of the present disclosure.
Figure 12:
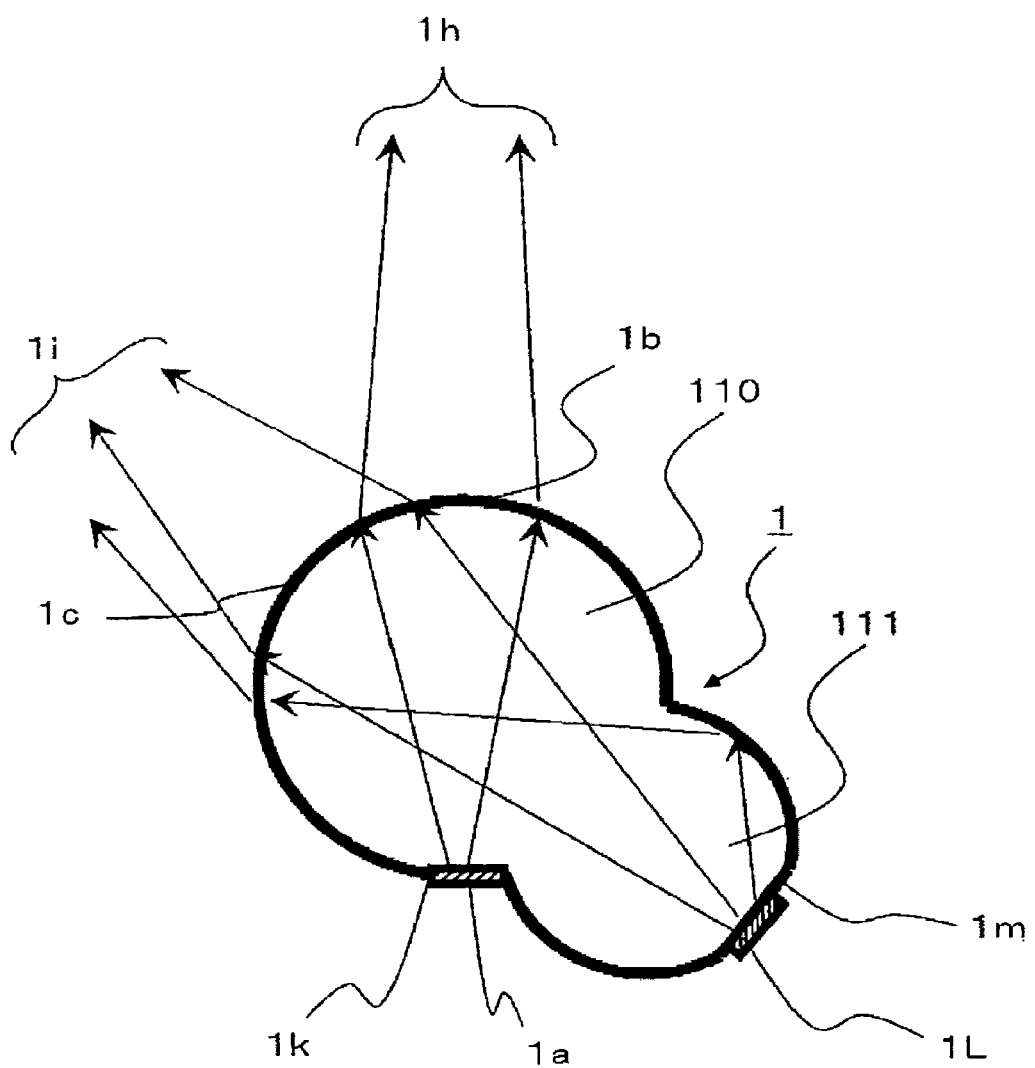
FIG. 12 is a diagram illustrating an optical path in the transverse cross section of the light guide according to the fourth embodiment.

The structure and operation of a light guide according to a fourth embodiment of the present disclosure are described with reference to FIGS. 11 and 12. FIG. 11 is a cross-sectional view of the light guide according to the fourth embodiment of the present disclosure. FIG. 12 is a diagram illustrating an optical path in the transverse cross section of the light guide according to the fourth embodiment of the present disclosure. In FIGS. 11 and 12, same reference signs denote the same or similar components to those in FIGS. 9 and 10, and further descriptions thereof are omitted here.

The light guide 1 according to the present embodiment is formed of a transparent resin and extends in the longitudinal direction. The light guide 1 according to the present embodiment forms a shape, in the transverse cross section, of two circles (round parts) 110 and 111 connected so that the circles have a common chord. The light guide 1 according to the present embodiment has a bottom surface 1k having a light diverting surface 1a extending along the entire longitudinal extent and a bottom surface 1m having a light diverting surface 1L extending along the entire longitudinal extent. In the transverse cross section, the bottom surface 1m is positioned outside a round-shaped light guide. The bottom surfaces 1k and 1m connect through a curved side surface 1d. An exit portion 1b and the bottom surface 1m connect through a curved side surface 1e.

The light guide 1 according to the present embodiment is a rod-shaped member extending in the longitudinal direction and having a circular cross section perpendicular to the longitudinal direction. The light diverting surface 1a has a white printed pattern or uneven shape formed along the longitudinal direction of the light guide 1. The light diverting surface 1a is positioned at the outer periphery of the round part 110 in the transverse cross section. Exit portions 1b and 1c are formed in different portions of the round part 110 in the transverse cross section and form a smooth continuous curved surface. In addition, the normal to the bottom surface 1m is on a line extending through centers of two circles 110 and 111. The distance between the exit portion 1b and the light diverting surface 1a is shorter than the distance between the exit portion 1c and the light diverting surface 1L.

As illustrated in FIG. 12, light reflected by the light diverting surface 1a is focused at an orientation angle by the exit portion 1b, whereas light reflected by the light diverting surface 1L is focused at an orientation angle by the exit portion 1c. The optical axis of primary light 1h emitted from the exit portion 1b intersects the optical axis of secondary light 1i emitted from the exit portion 1c.

As described above, the light diverting surface 1L is positioned, in the cross section perpendicular to the longitudinal direction, at the tip of a convex shaped portion formed from a part of the circle 110 of the light guide 1, and has a white printed pattern or uneven shape formed along the longitudinal direction.

The bottom surface 1m projects sufficiently from the circle 110 in the cross section perpendicular to the longitudinal direction. Thus the direction of light can be controlled due to the shielding effect of the portions connecting two circles 110 and 111.

The light guide 1 according to the present embodiment enables the single light guide to emit light in two directions.

In addition, the distance from the light diverting surface 1a to the exit portion 1b is shorter than the distance from the light diverting surface 1L to the exit portion 1c. Therefore, the amount of primary light 1h emitted from the exit portion 1b is greater than the amount of secondary light 1i emitted from the exit portion 1c.

Fifth Embodiment

Figure 13:
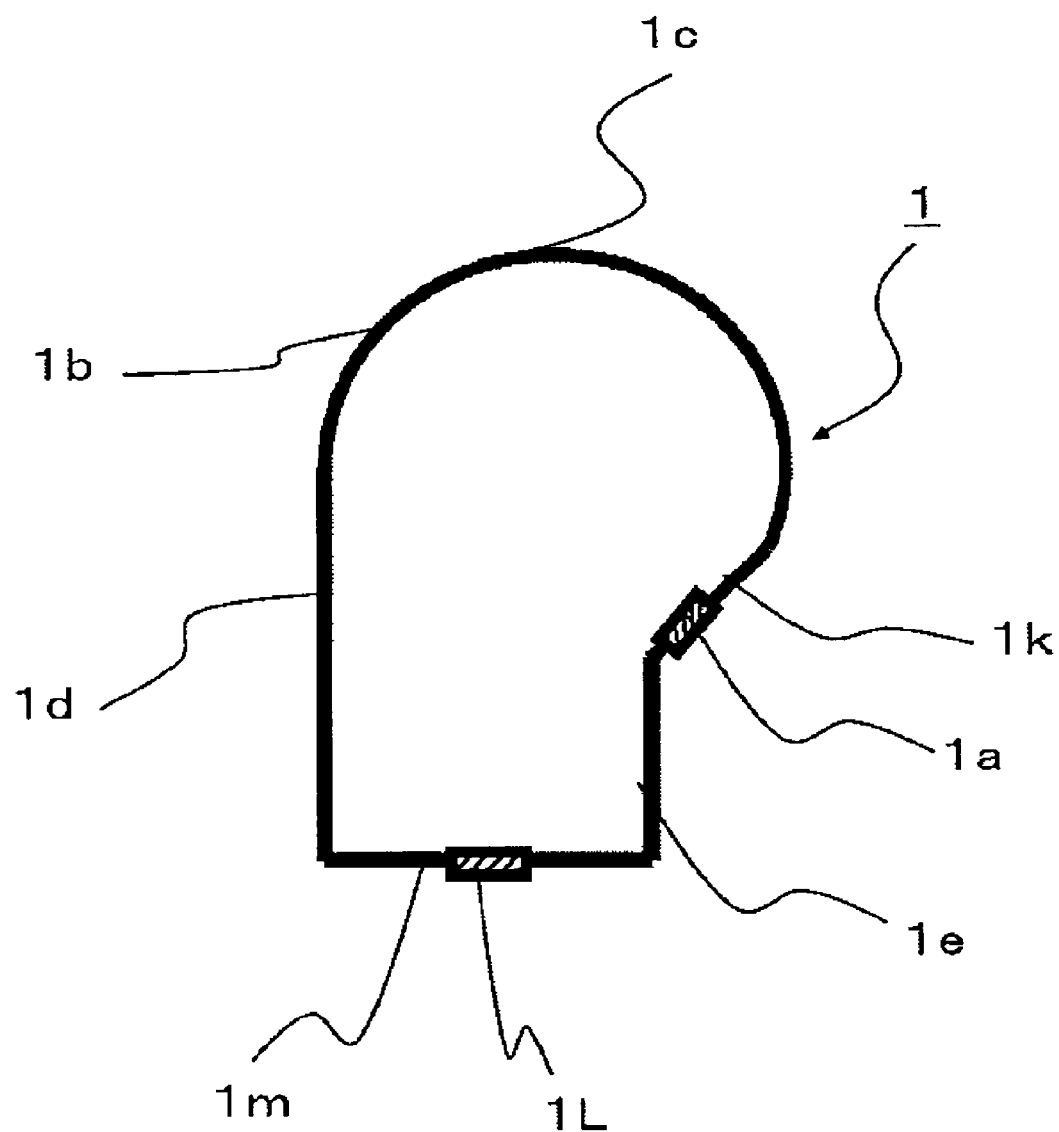
FIG. 13 is a cross-sectional view of a light guide according to a fifth embodiment of the present disclosure.
Figure 14:
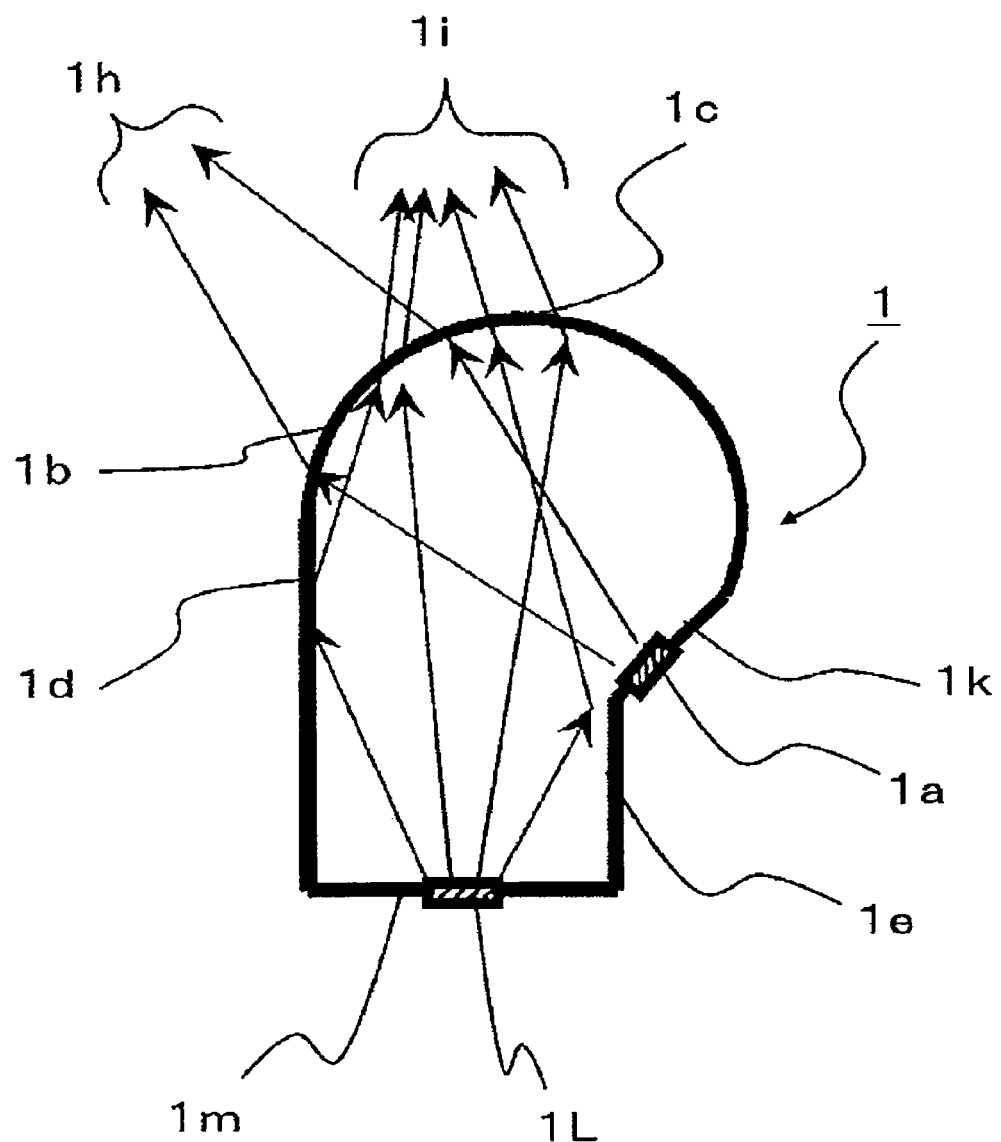
FIG. 14 is a diagram illustrating an optical path in the transverse cross section of the light guide according to the fifth embodiment.

The structure and operation of a light guide according to a fifth embodiment of the present disclosure are described with reference to FIGS. 13 and 14. FIG. 13 is a cross-sectional view of the light guide according to the fifth embodiment of the present disclosure. FIG. 14 is a diagram illustrating an optical path in the transverse cross section of the light guide according to the fifth embodiment of the present disclosure. In FIGS. 13 and 14, same reference signs denote the same or similar components to those in FIGS. 9 and 10, and further descriptions thereof are omitted here.

The light guide 1 is a rod-shaped member formed of a transparent resin and extending in the longitudinal direction. The light guide 1 according to the present embodiment forms a shape obtained by connecting three sides of a rectangle to a circle in the transverse cross section (see FIG. 13).

The light guide 1 according to the present embodiment has a bottom surface 1m having a light diverting surface 1L extending along the entire longitudinal extent and a planar surface 1k having a light diverting surface 1a extending along the entire longitudinal extent. The planar surface 1k connects smoothly to an exit portion 1c. In the transverse cross section, the bottom surface 1m is positioned outside the round-shaped portion. One side surface (side wall portion) 1d is planar. An end of the one side surface (side wall portion) 1d is perpendicular to an end (left end in FIG. 13) of the bottom surface (plane facing a second exit portion 1c) 1m in the transverse cross section. The other end of the one side surface (side wall portion) 1d extends to connect to a first curved surface of a first exit portion 1b (to connect smoothly to the exit portion 1b) in the transverse cross section. An end of the other side surface 1e is perpendicular to the other end (right end in FIG. 13) of the bottom surface 1m and the other end of the other side surface 1e connects to an end (lower end in FIG. 13) of the planar surface 1k in the transverse cross section. In addition, the planar surface 1k and the bottom surface 1m have respective normals pointing in different directions.

The light diverting surface 1a has a white printed pattern or uneven shape formed along the longitudinal direction of the light guide 1 and is positioned at the outer periphery of a round part in the transverse cross section. The first and second curved surfaces have the same curvature, and the exit portions 1b and 1c form a smooth continuous curved surface. The distance between the exit portion 1b and the light diverting surface 1a is shorter than the distance between the exit portion 1c and the light diverting surface 1L.

As illustrated in FIG. 14, light reflected by the light diverting surface 1a is focused at an orientation angle by the exit portion 1b, whereas light reflected by the light diverting surface 1L is focused at an orientation angle by the exit portion 1c. In addition, the side surface 1d reflects light reflected by the reflecting portion 1L to the exit portion 1c and guides light in the long axis direction of the light guide 1. The bottom surface 1m projects sufficiently from the circle in the cross section perpendicular to the longitudinal direction. Thus the direction of light can be controlled due to the reflection on the side surfaces 1d and 1e.

The light guide 1 according to the present embodiment enables the single light guide to emit light in two directions.

In addition, the distance from the light diverting surface 1a to the exit portion 1b is shorter than the distance from the light diverting surface 1L to the exit portion 1c. Therefore, the amount of primary light 1h emitted from the exit portion 1b is greater than the amount of secondary light 1i emitted from the exit portion 1c.

Sixth Embodiment

The structure and operation of a light guide according to a sixth embodiment of the present disclosure are described with reference to FIGS. 15 and 16.

Figure 15:
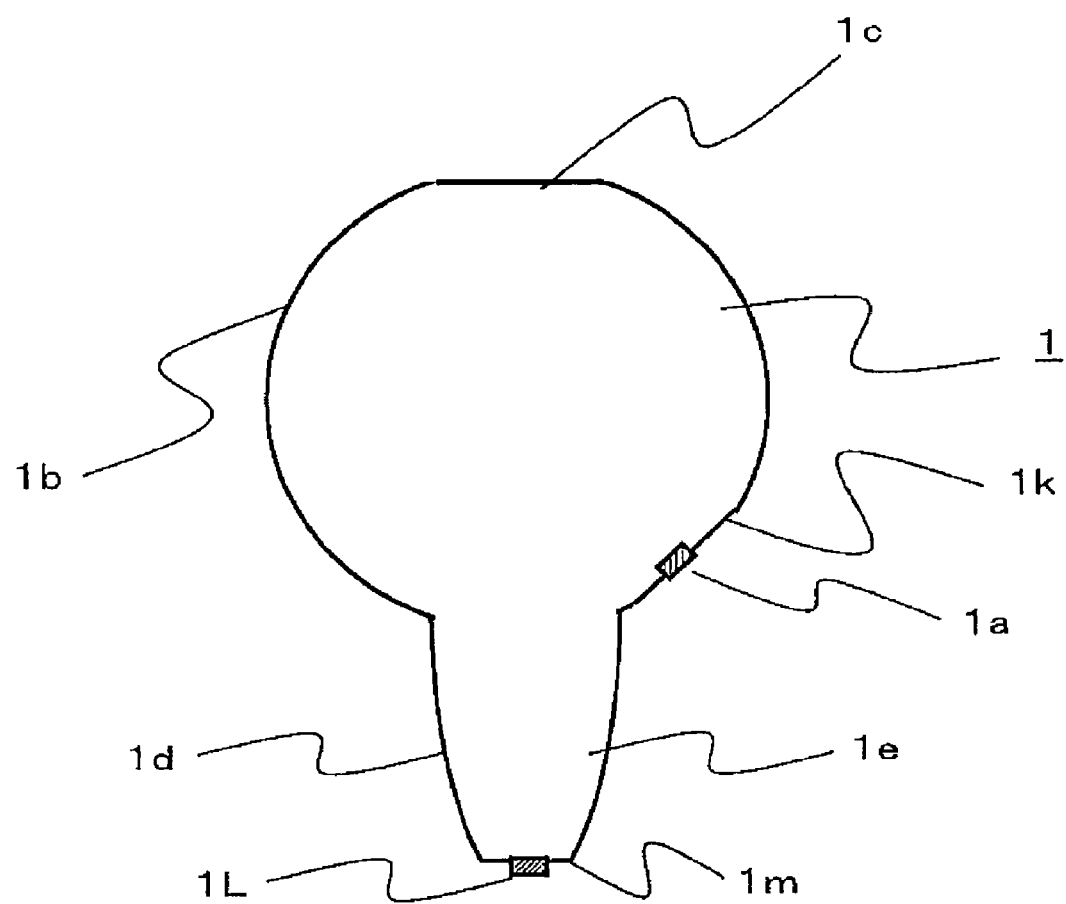
FIG. 15 is a cross-sectional view of a light guide according to a sixth embodiment of the present disclosure.

FIG. 15 is a cross-sectional view of the light guide according to the sixth embodiment of the present disclosure. FIG. 16 is a diagram illustrating an optical path in the transverse cross section of the light guide according to the sixth embodiment of the present disclosure. In FIGS. 15 and 16, same reference signs denote the same or similar components to those in FIGS. 9 and 10, and further descriptions thereof are omitted here.

The light guide 1 is a rod-shaped member formed of a transparent resin and extending in the longitudinal direction. In a cross section perpendicular to the longitudinal direction, the light guide 1 according to the present embodiment forms a shape obtained by connecting an ellipse to a circle (see FIG. 15).

The light guide 1 according to the present embodiment has a bottom surface 1m having a light diverting surface 1L extending along the entire longitudinal extent and a planar surface 1k having a light diverting surface 1a extending along the entire longitudinal extent. The planar surface 1k connects smoothly to the exit portion 1c. In the cross section perpendicular to the longitudinal direction, the bottom surface 1m is positioned outside a round-shaped light guide. One side surface 1d of the bottom surface 1m is a curved surface and has a convex shape in the transverse cross section. In the transverse cross section, an end of the one side surface (side wall portion) 1d connects to an end (left end in FIG. 15) of a plane facing a second exit portion 1c. In the transverse cross section, the other end of the one side surface (side wall portion) 1d extends to connect to a first curved surface of a first exit portion 1b. The other side surface 1e of the bottom surface 1m connects to the planar surface 1k.

The side surfaces 1d and 1e each have an identical focal point on the light diverting surface 1L, so that light scattered by the light diverting surface 1L is reflected as collimated light. In addition, the planar surface 1k and the bottom surface 1m have respective normals pointing in different directions.

The light diverting surface 1a has a white printed pattern or uneven shape formed along the longitudinal direction of the light guide 1 and is positioned at the outer periphery of the round part in the cross section perpendicular to the longitudinal direction. The exit portion 1b has a smooth curved surface (first curved surface) and is continuous with the planar exit portion 1c. In the present embodiment, the exit portion 1c is a plane, but may be a curved surface.

Figure 16:
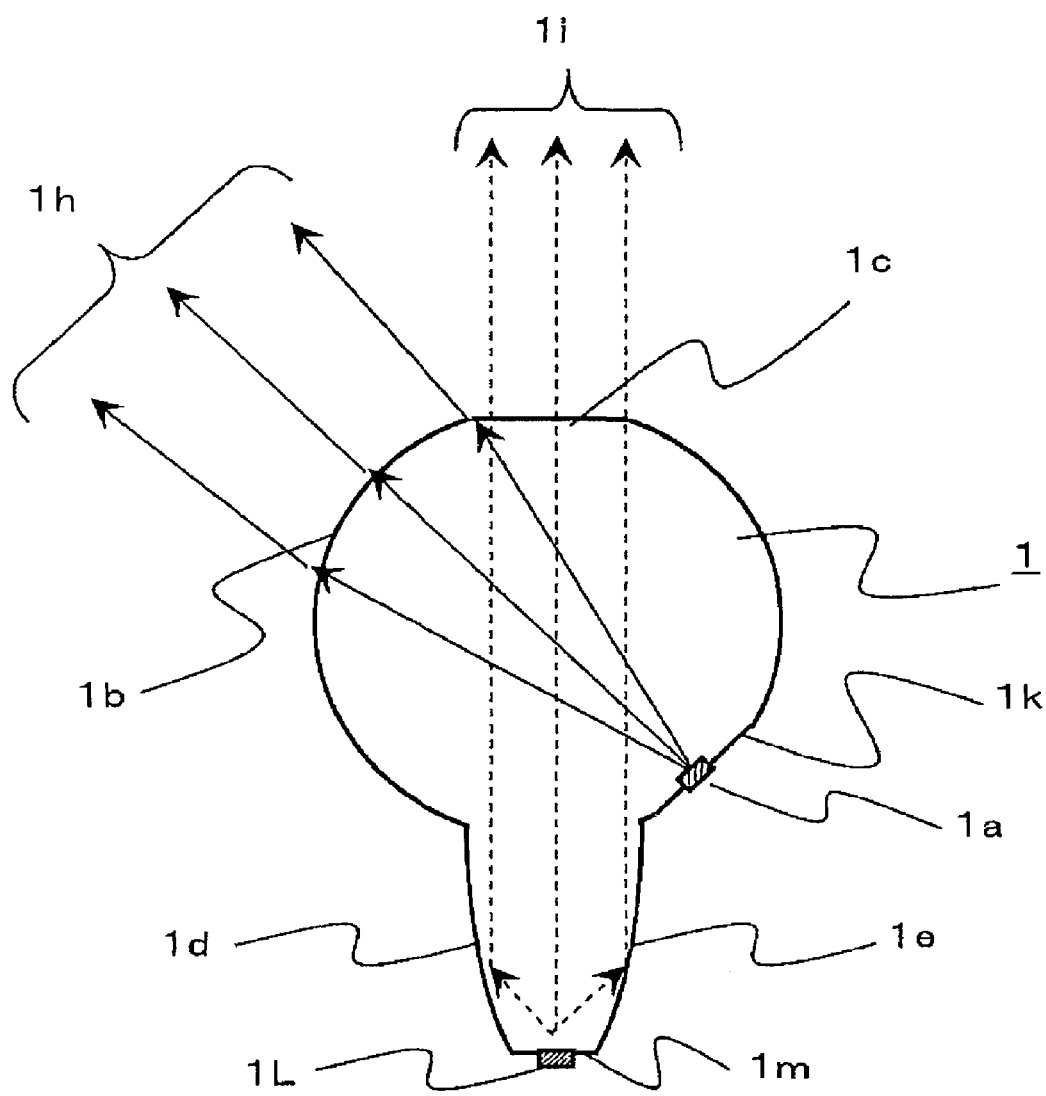
FIG. 16 is a diagram illustrating an optical path in the transverse cross section of the light guide according to the sixth embodiment.

As illustrated in FIG. 16, light reflected by the light diverting surface 1a is focused at an orientation angle by the exit portion 1b, whereas light reflected by the light diverting surface 1L is focused at an orientation angle by the exit portion 1c. In addition, the side surface 1d reflects light reflected by the reflecting portion 1L to the exit portion 1c and guides light in the long axis direction of the light guide 1. The bottom surface 1m projects sufficiently from the circle in the cross section perpendicular to the longitudinal direction. Thus the direction of light can be controlled due to the reflection on the side surfaces 1d and 1e.

The light guide 1 according to the present embodiment enables the single light guide 1 to emit light in two directions.

Seventh Embodiment

The structure and operation of a light guide according to a seventh embodiment of the present disclosure are described with reference to FIGS. 17 and 18.

Figure 17:
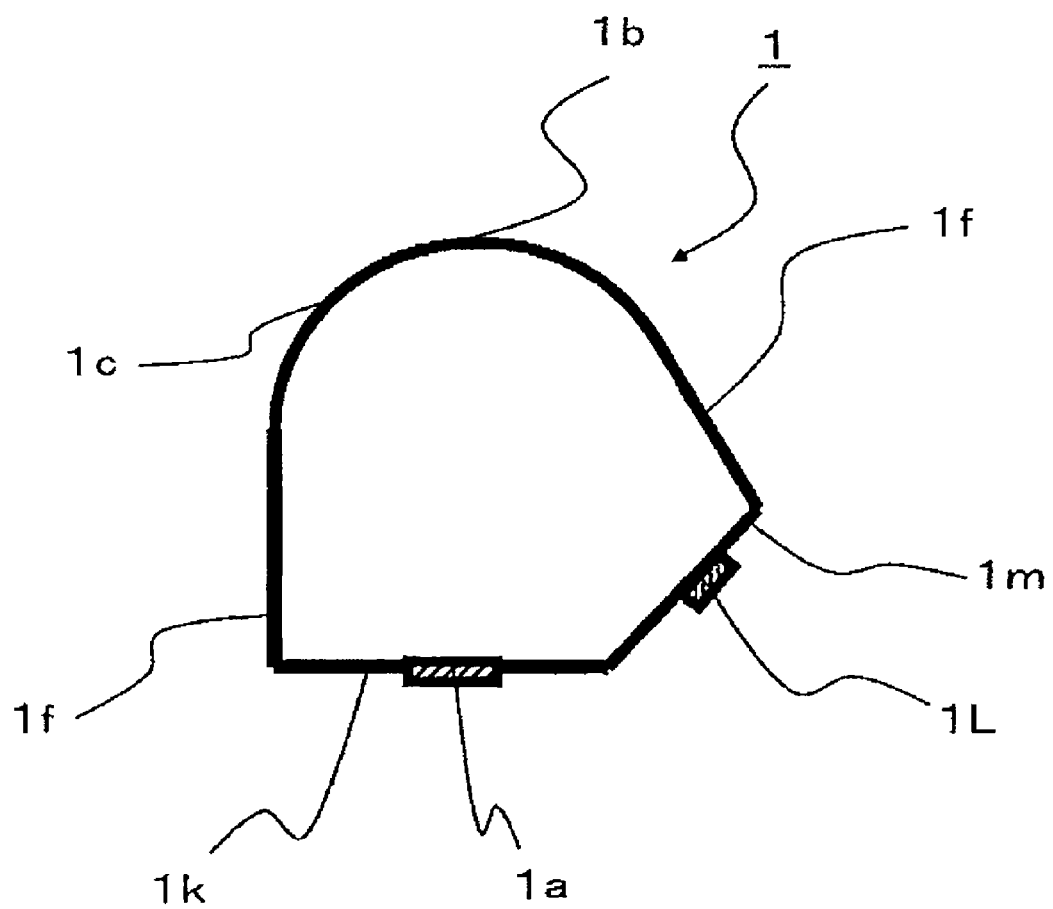
FIG. 17 is a cross-sectional view of a light guide according to a seventh embodiment of the present disclosure.

FIG. 17 is a cross-sectional view of the light guide according to the seventh embodiment of the present disclosure. FIG. 18 is a diagram illustrating an optical path in the transverse cross section of the light guide according to the seventh embodiment of the present disclosure. In FIGS. 17 and 18, same reference signs denote the same or similar components to those in FIGS. 9 and 10, and further descriptions thereof are omitted here.

The light guide 1 is a rod-shaped member formed of a transparent resin and extending in the longitudinal direction. In a cross section perpendicular to the longitudinal direction, the light guide 1 according to the present embodiment forms a shape obtained by connecting four straight lines to a circle.

The light guide 1 according to the present embodiment has a bottom surface 1k having a light diverting surface 1a extending along the entire longitudinal extent and a bottom surface 1m having a light diverting surface 1L extending along the entire longitudinal extent. One side surface 1f connects smoothly to an exit portion 1c. The other side surface 1f connects smoothly to an exit portion 1b. The one side surface 1f and the other side surface 1f connect via the bottom surfaces 1k and 1m. In addition, the planar surface 1m and the bottom surface 1k have respective normals pointing in different directions. The exit portions 1b and 1c form a smooth continuous curved surface. The light diverting surface 1a has an area larger than the area of the light diverting surface 1L. That is, the light diverting surface 1a has a transverse length longer than the length of the light diverting surface 1L.

Figure 18:
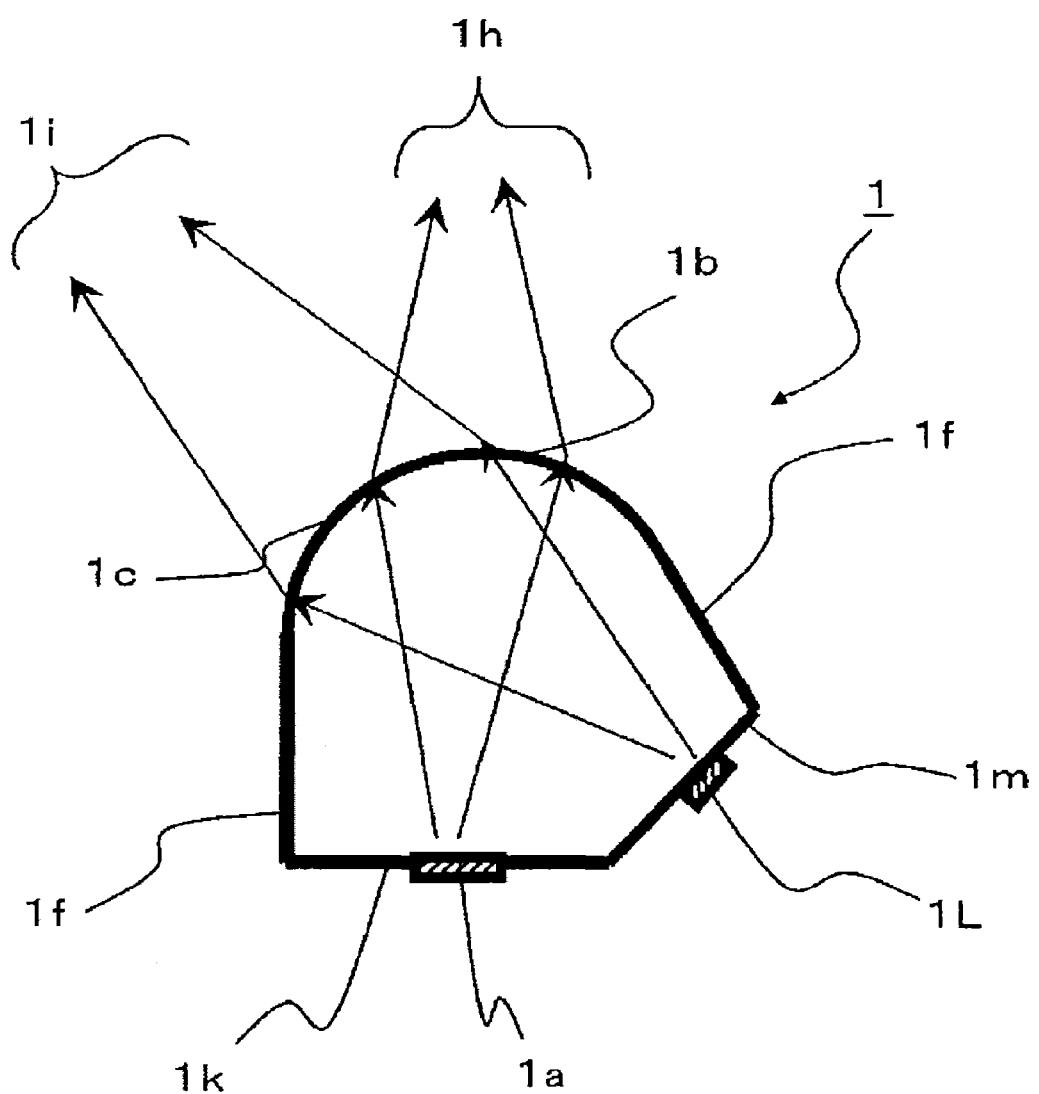
FIG. 18 is a diagram illustrating an optical path in the transverse cross section of the light guide according to the seventh embodiment.

As illustrated in FIG. 18, light reflected by the light diverting surface 1a is focused at an orientation angle by the exit portion 1b, whereas light reflected by the light diverting surface 1L is focused at an orientation angle by the exit portion 1c.

The light guide 1 according to the present embodiment enables the single light guide to emit light in two directions.

The light diverting surface 1a has an area larger than the area of the light diverting surface 1L, so that the amount of primary light 1h emitted from the exit portion 1b is greater than the amount of secondary light 1i emitted from the exit portion 1c.

Eighth Embodiment

The structure and operation of a light guide according to an eighth embodiment of the present disclosure are described with reference to FIGS. 19 to 25.

Figure 19:
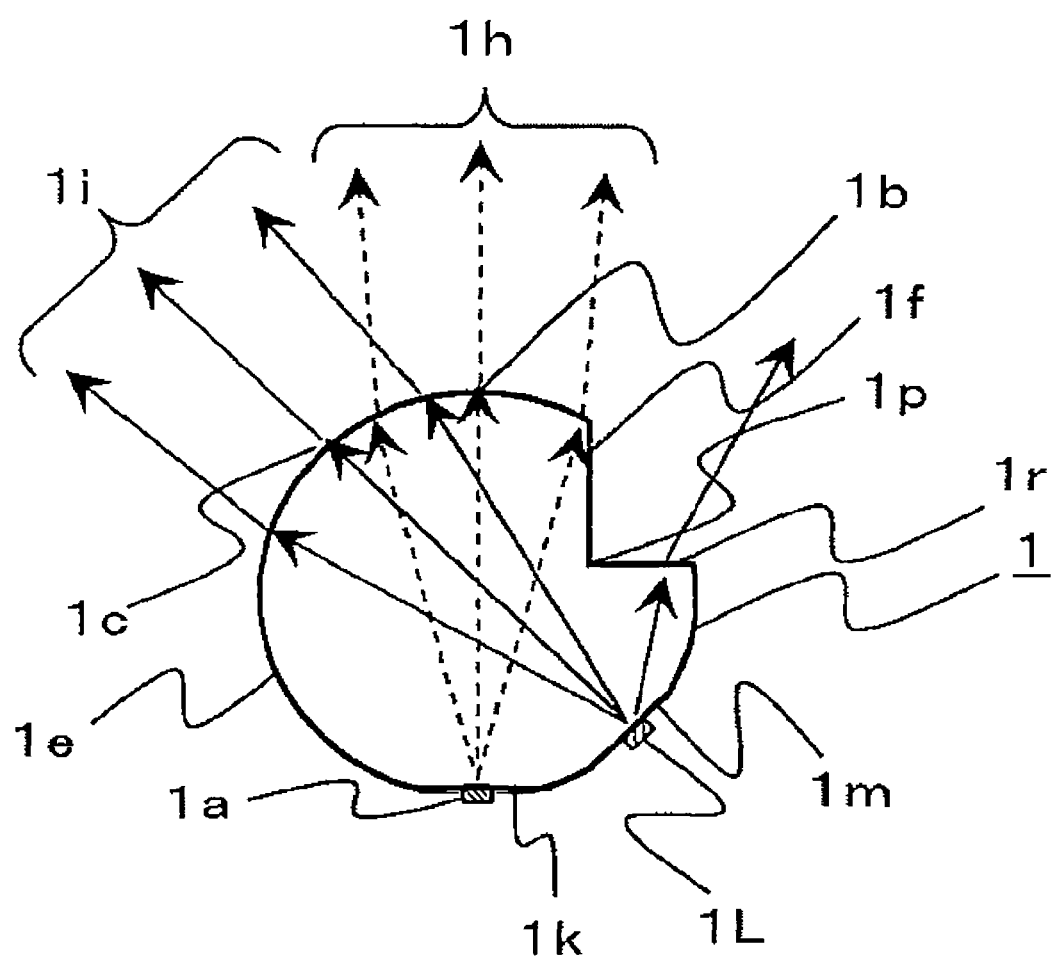
FIG. 19 is a diagram illustrating an optical path in the transverse cross section of a light guide according to an eighth embodiment of the present disclosure.

FIG. 19 is a diagram illustrating an optical path in the transverse cross section of the light guide according to the eighth embodiment of the present disclosure. In FIGS. 19 to 25, same reference signs denote the same or similar components to those in FIGS. 9 and 10, and further descriptions thereof are omitted here.

The light guide 1 is a rod-shaped member formed of a transparent resin and extending in the longitudinal direction.

The light guide 1 according to the present embodiment forms a circular shape in a cross section perpendicular to the longitudinal direction.

A side surface 1f between a first exit portion 1b and a light diverting surface 1L is provided with a notch (recess) 1p along the entire longitudinal extent. The notch 1p is formed of planar side surfaces 1f and 1r. The side surfaces 1f and 1r are perpendicular to each other in the transverse cross section. The side surface 1f of the notch 1p is parallel to the optical axis of primary light 1h in the transverse cross section.

The light guide 1 according to the present embodiment has a bottom surface 1k having a light diverting surface 1a extending along the entire longitudinal extent and a bottom surface 1m having a light diverting surface 1L extending along the entire longitudinal extent. Exit portions 1c and 1b form a smooth continuous curved surface and are connected smoothly in the transverse cross section. The other side surface 1f of the notch 1p connects smoothly to the exit portion 1b in the transverse cross section. The one side surface 1f and the other side surface 1r are perpendicular to each other in the transverse cross section, as described above. The other side surface 1r connects to the exit portion 1c via bottom surfaces 1k and 1m, a curved surface 1e that is smoothly continuous with the exit portion 1c, and the like in the transverse cross section. In addition, the planar surface 1m and the bottom surface 1k have respective normals pointing in different directions.

Figure 20:
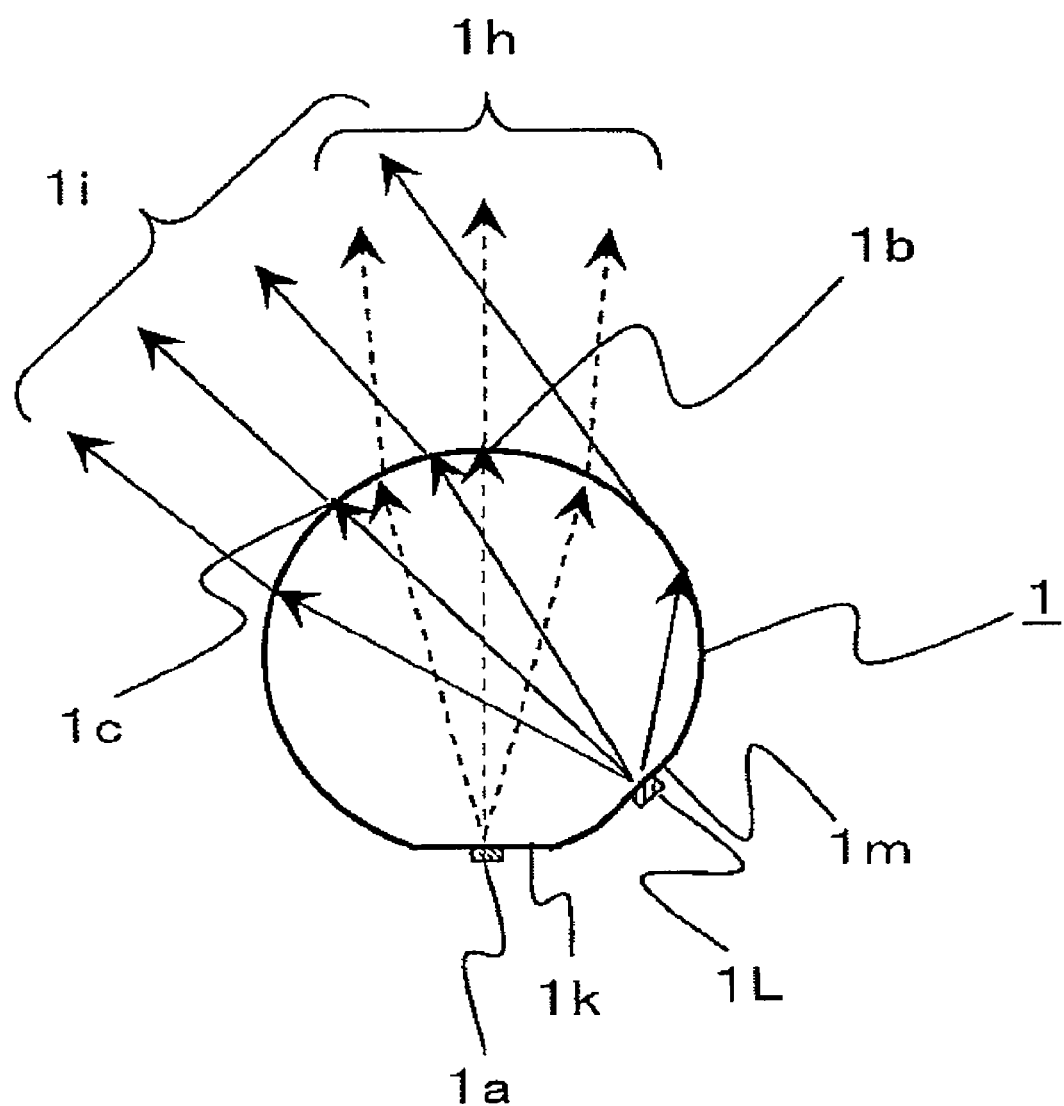
FIG. 20 is a diagram illustrating an optical path in the transverse cross section of a light guide without a notch, which is different from the light guide according to the eighth embodiment.

A light guide 1 illustrated in FIG. 20 is different from the light guide 1 illustrated in FIG. 19 in that the side surface has no notches, and the light diverting surface 1L scatters more. In this case, secondary light 1i extends wider, thus overlapping with primary light 1h. Light irradiation of an object to be irradiated (object to be read) in this overlapped state causes the secondary light 1i to have a greater incident angle with respect to the object to be irradiated. This results in shifts in illumination position and large changes in brightness when the distance between a glass on which the object to be irradiated is mounted and the object to be irradiated varies depending on positioning. Accordingly, providing the notch 1p on the side surface of the light guide 1, as illustrated in FIG. 19, blocks an optical path that may cause wider secondary light 1i.

Figure 21:
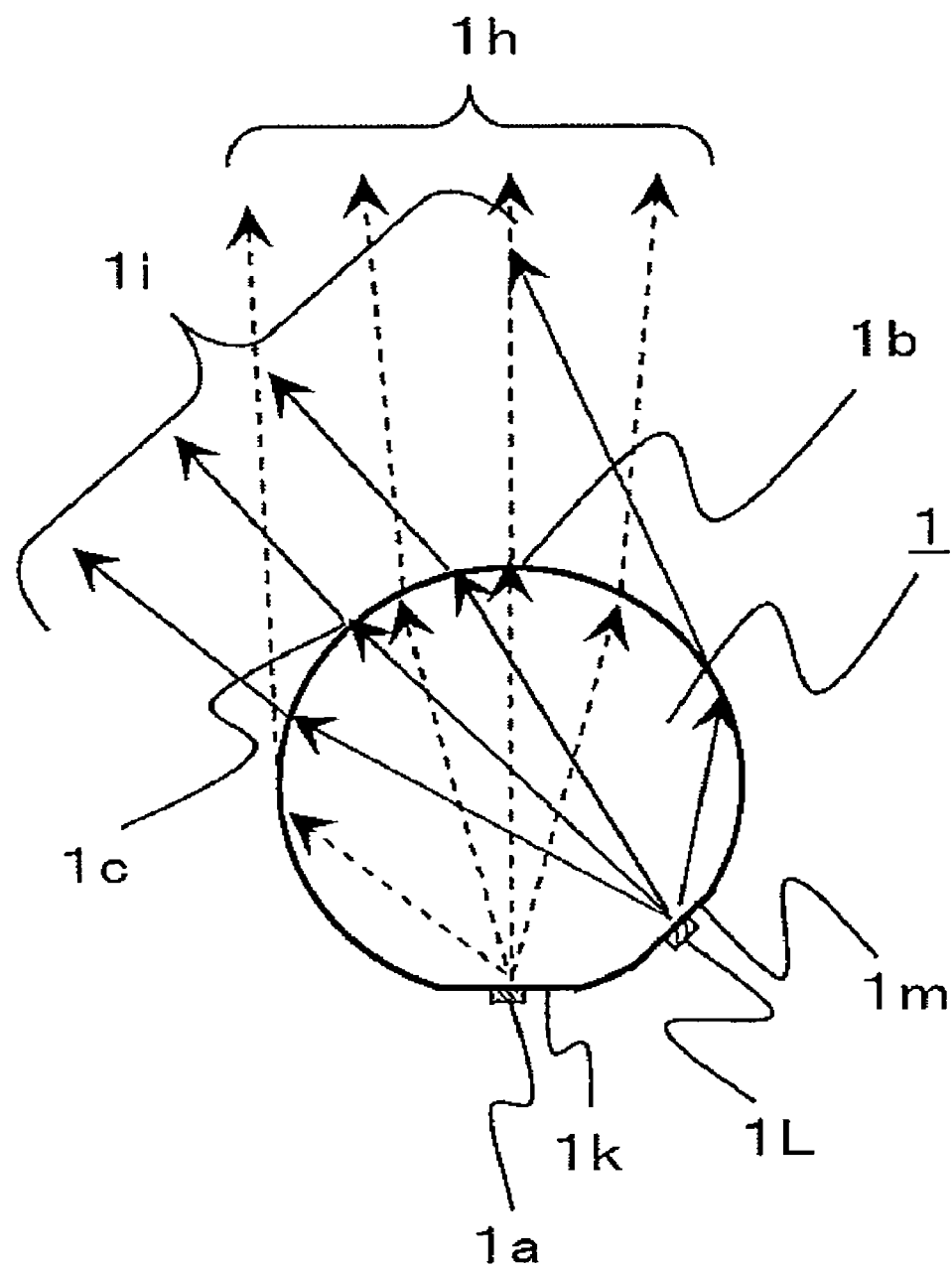
FIG. 21 is a diagram illustrating an optical path in the transverse cross section of a light guide without a notch, which is different from the light guide according to the eighth embodiment.
Figure 22:
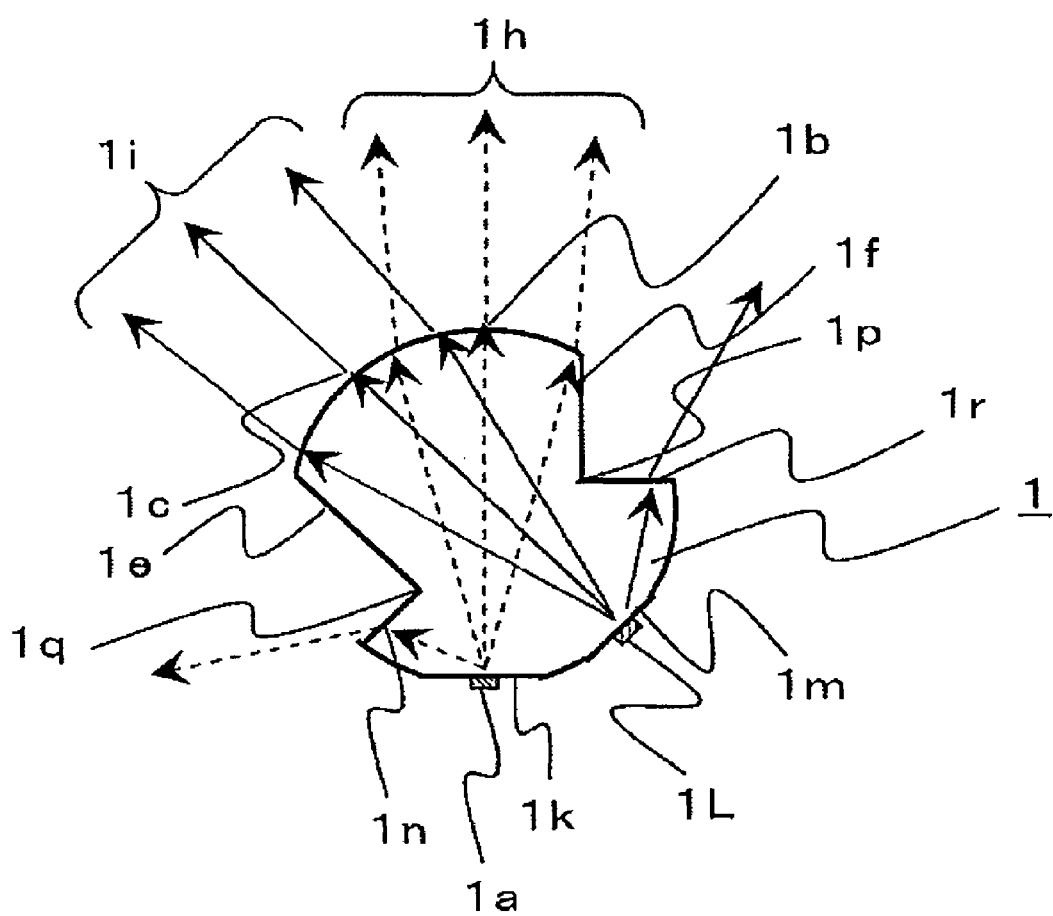
FIG. 22 is a diagram illustrating an optical path in the transverse cross section of a light guide with two notches according to the eighth embodiment.

FIG. 21 illustrates a light guide 1 with light diverting surfaces 1a and 1L having larger scattering angles. As illustrated in FIG. 22, this light guide 1 also eliminates or reduces overlapping of primary light 1h and secondary light 1i by providing notches 1p and 1q in the side surfaces. Here, the notch 1p is formed by planar surfaces 1f and 1r. The side surfaces 1f and 1r are perpendicular to each other. The notch 1q is formed of planar side surfaces 1e and 1n. The side surfaces 1e and 1n are perpendicular to each other. In addition, the side surface 1f is parallel to the optical axis of primary light 1h. The side surface 1e is parallel to the optical axis of secondary light 1i.

Figure 23:
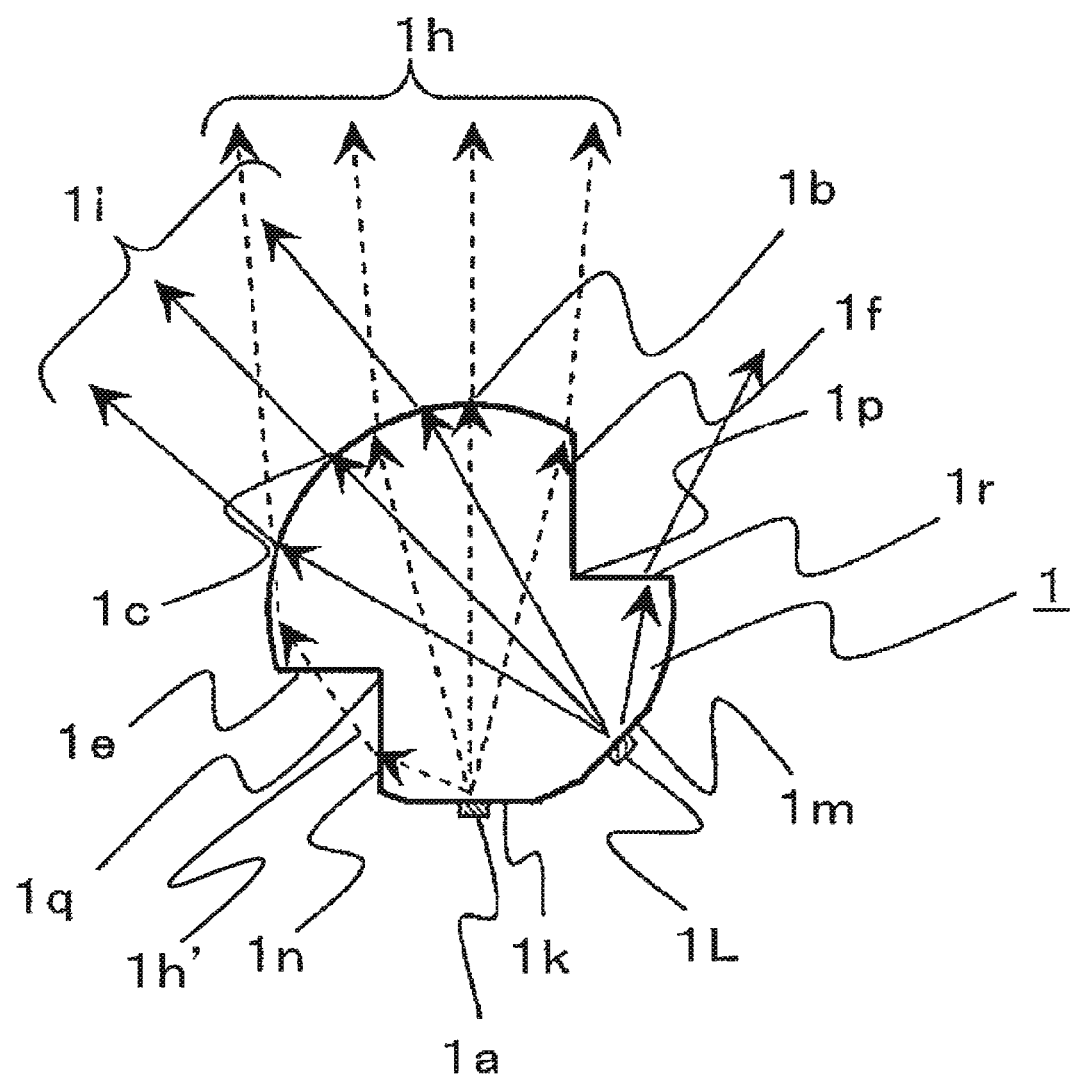
FIG. 23 is a diagram illustrating an optical path in the transverse cross section of a light guide with notches according to the eighth embodiment, with the cutting direction adjusted.
Figure 24:
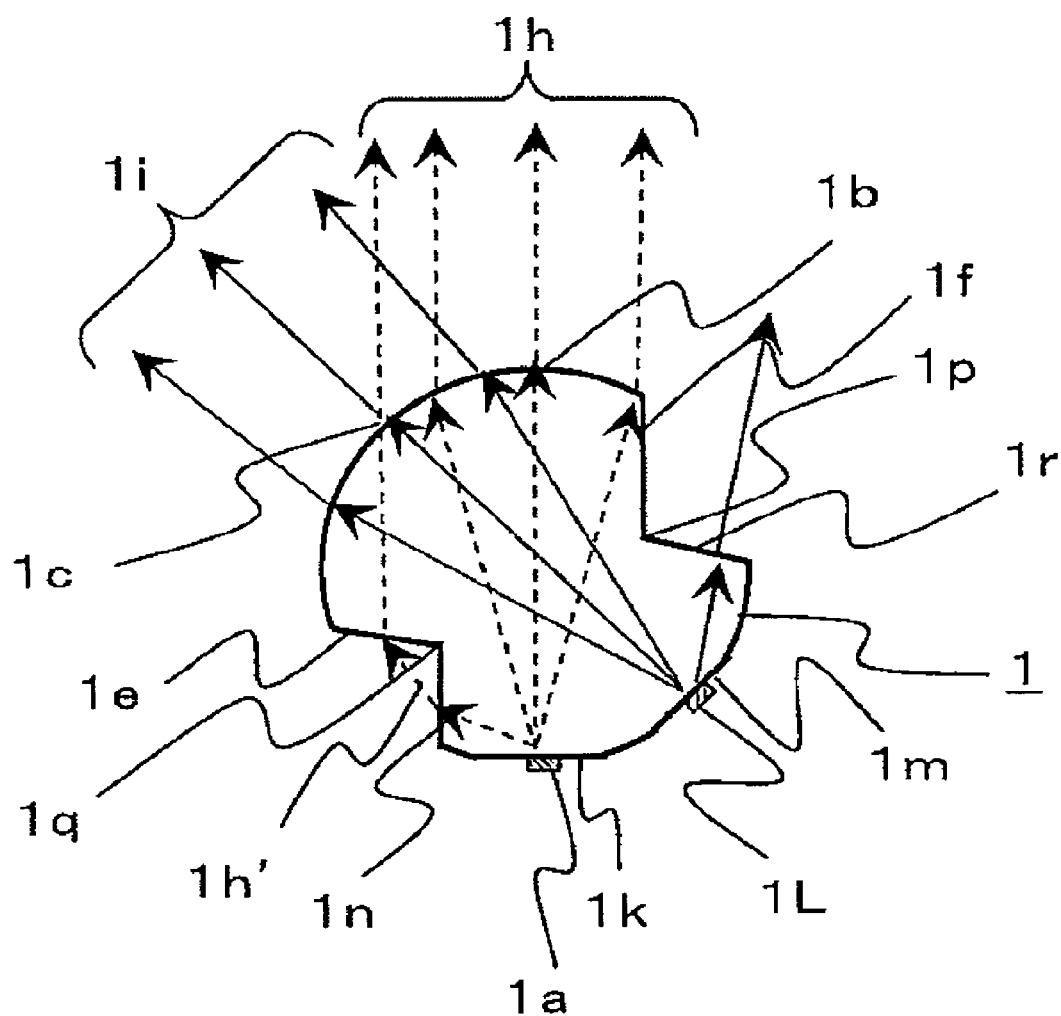
FIG. 24 is a diagram illustrating an optical path in the transverse cross section of a light guide with notches according to the eighth embodiment, with the cutting plane angle thereof adjusted.

The light guide 1 as illustrated in FIG. 22 is provided with the notches 1p and 1q such that the side surface 1f of the notch 1p is parallel to the optical axis of primary light 1h and the side surface 1e of the notch 1q is parallel to the optical axis of secondary light 1i. In this case, a mold is required to be opened in a direction perpendicular to an average angle of light exit angles of primary light 1h and secondary light 1i, thus forming the joint of the mold between the exit portions 1c and 1b. The joint line of the mold between the exit portions 1c and 1b may cause refraction of exiting light. Thus, a light guide 1 as illustrated in FIG. 23 as another modified example is provided with notches 1p and 1q such that a side surface 1*f* of the notch 1*p* is parallel to the optical axis of primary light 1*h* and a side surface 1*n* of the notch 1*q* is parallel to the optical axis of primary light 1*h*. This prevents the joint line from being formed between the exit portions 1*c* and 1*b*, because the mold opens in the direction of primary light 1*h*.

Only the notches of the light guide 1 as illustrated in FIG. 23 causes an optical path 1*h*' of light that reenters the light guide from the notch 1*q* after exiting from the side surface of the notch 1*q*. Primary light 1*h* may be spread widely thereby. Accordingly, as another modified example, inclined side surfaces of the notches 1*p* and 1*q* may be formed, as illustrated in the light guide 1 in FIG. 24, to prevent primary light 1*b* from extending wider by this optical path. That is, the side surfaces 1*e* and 1*n* and the side surfaces 1*f* and 1*r* are formed so that the intersection angles between the side surfaces 1*e* and 1*n* and between the side surfaces 1*f* and 1*r* are obtuse angles.

Figure 25:
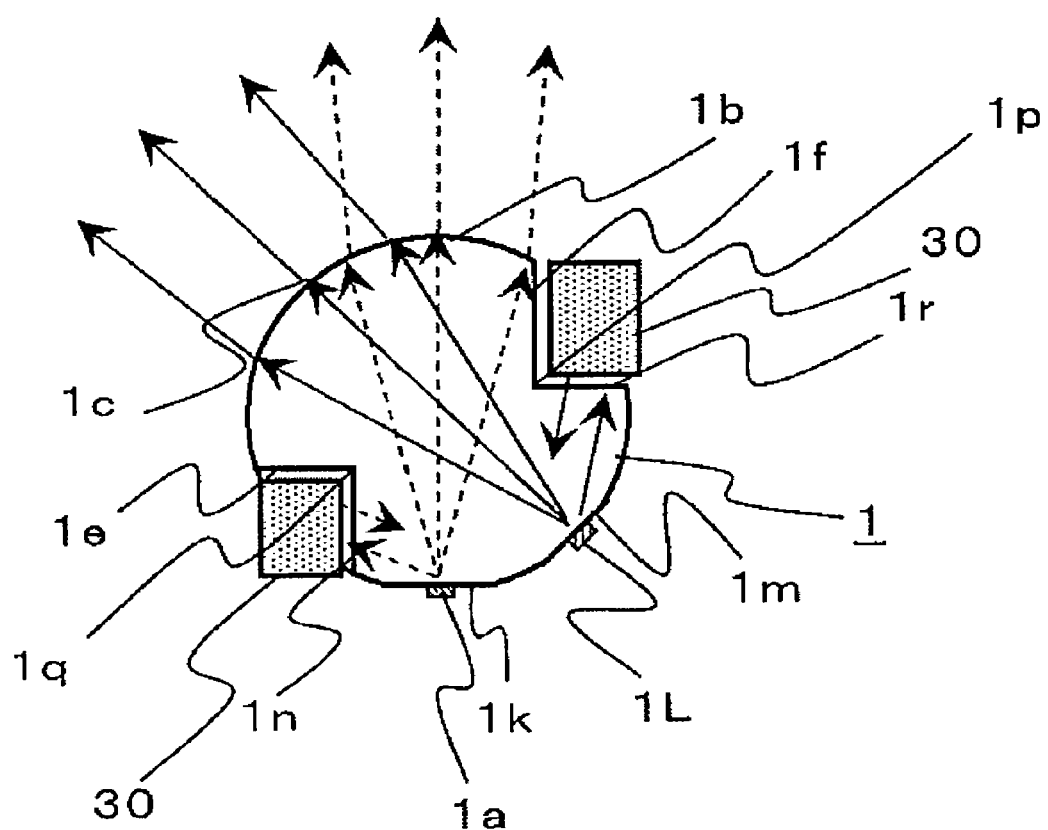
FIG. 25 is a diagram illustrating an optical path in the transverse cross section of a light guide with notches according to the eighth embodiment, the notches each being provided with a light blocking member.

In addition, as in a light guide 1 illustrated in FIG. 25, light may be blocked by providing light blocking members 30 sized so as to fit into the notches 1*p* and 1*q*. The light blocking member 30 may be made of high reflective material such as metal and white resin. This enables light leaking from the light guide 1 to reenter the light guide 1, thus increasing illumination light amount.

Ninth Embodiment

A light source device according to a ninth embodiment of the present disclosure is described with reference to the drawings. In the present embodiment, a bifurcated linear light source device using a light guide 1 according to the first embodiment is described.

Figure 26:
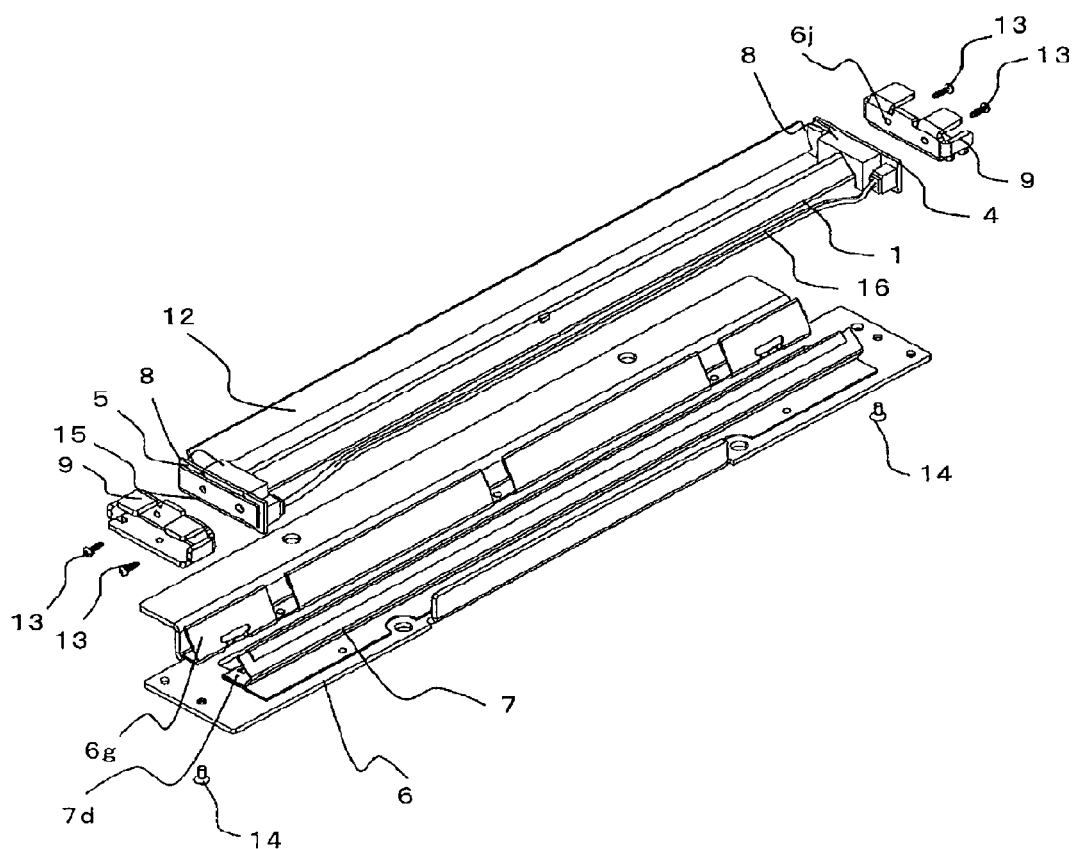
FIG. 26 is an exploded view illustrating the structure of a light source device according to a ninth embodiment of the present disclosure.
Figure 27:
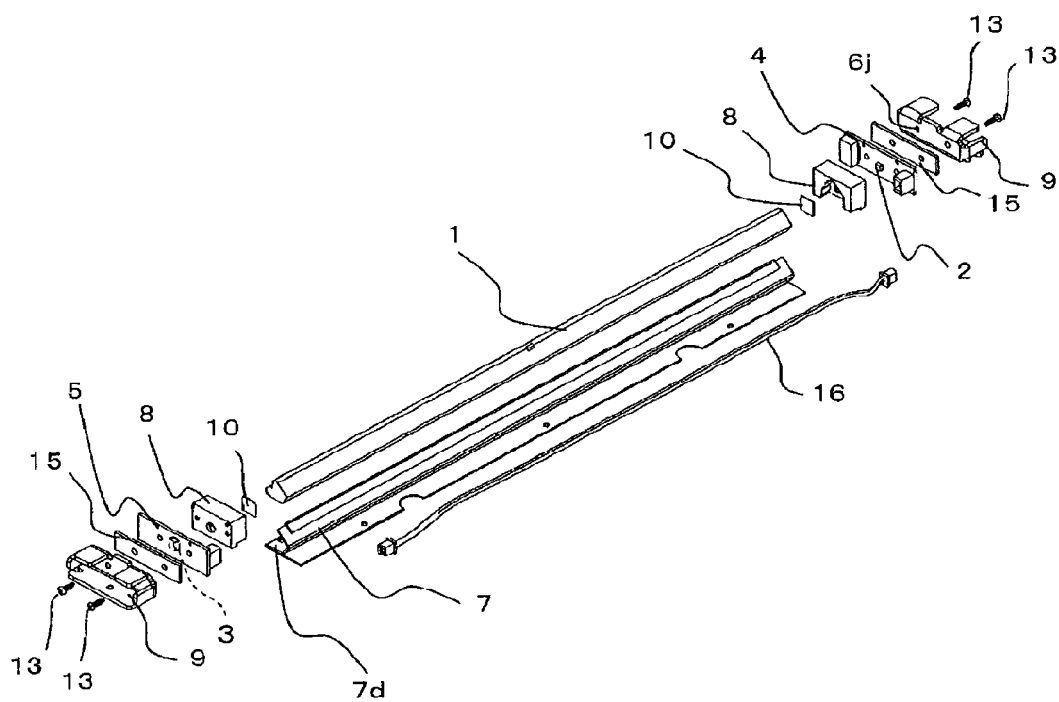
FIG. 27 is an exploded view illustrating a light source part of the light source device according to the ninth embodiment.
Figure 28:
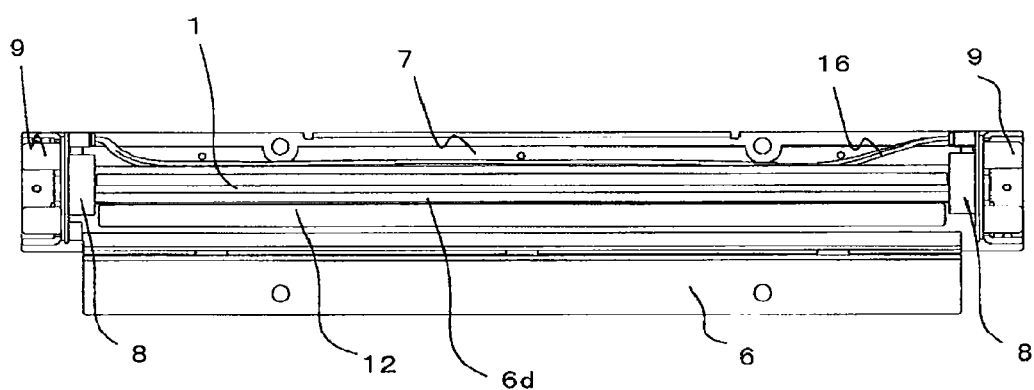
FIG. 28 is a top view of the light source device according to the ninth embodiment.
Figure 29A:
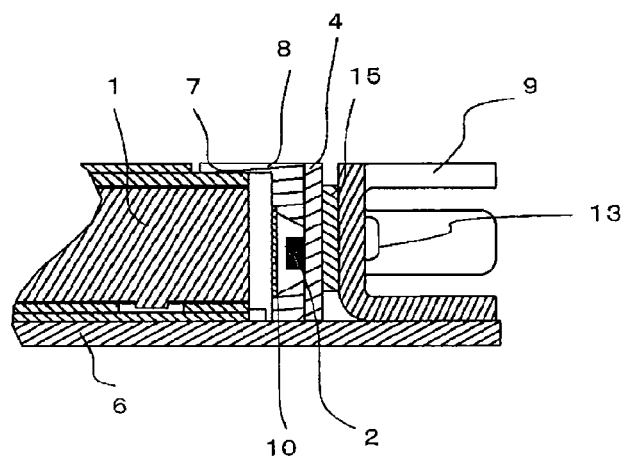
FIG. 29A is an enlarged cross-sectional view of the vicinity of the longitudinal end of the light source device according to the ninth embodiment.
Figure 29B:
FIG. 29B is a longitudinal sectional view of the light source device according to the ninth embodiment.
Figure 30A:
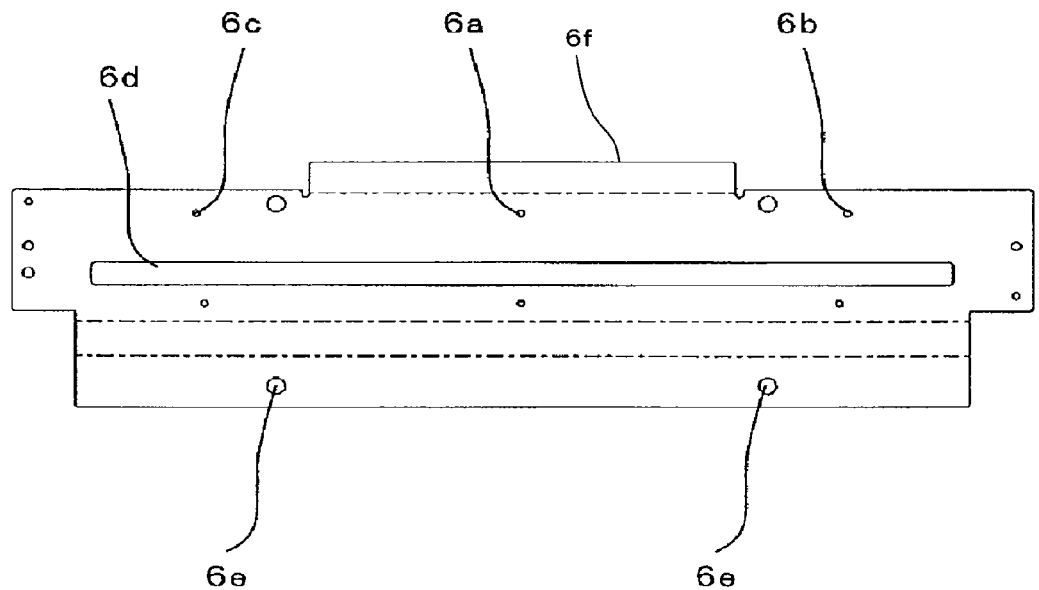
FIG. 30A is a development view of a plate-like member constituting a housing according to the ninth embodiment.
Figure 30B:
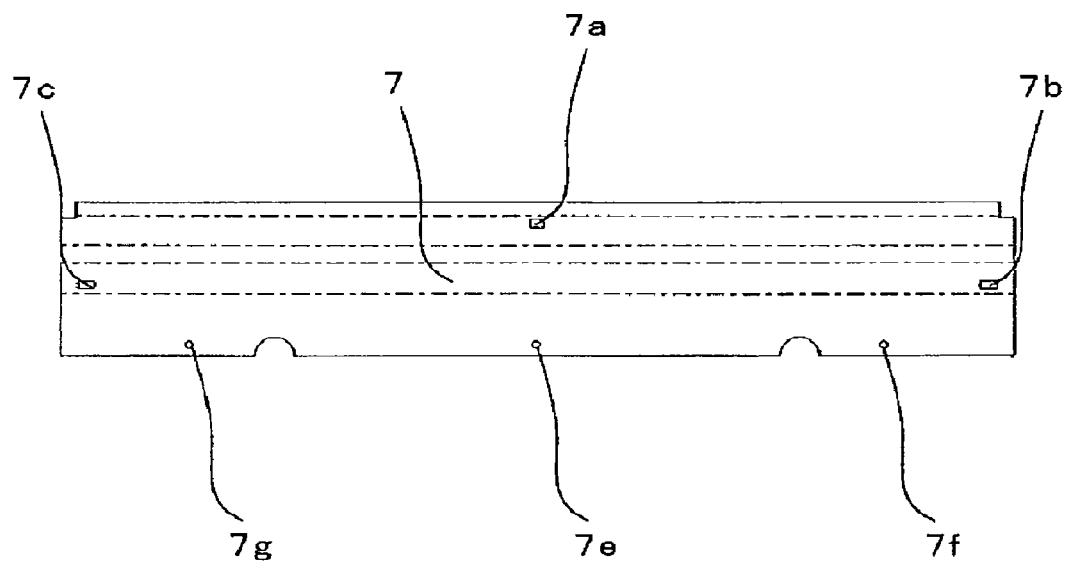
FIG. 30B is a development view of a plate-like member constituting a light guide holder according to the ninth embodiment.
Figure 30C:
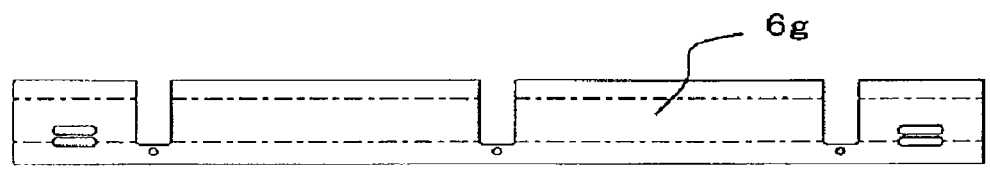
FIG. 30C is a development view of a plate-like member constituting a mirror mounting surface according to the ninth embodiment.
Figure 31A:
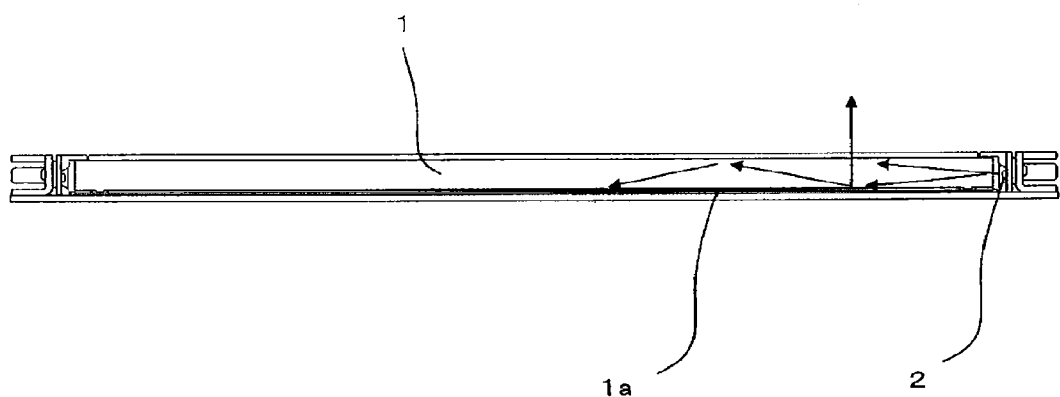
FIG. 31A is a diagram illustrating an optical path in the longitudinal cross section of the entire light source device according to the ninth embodiment.
Figure 31B:
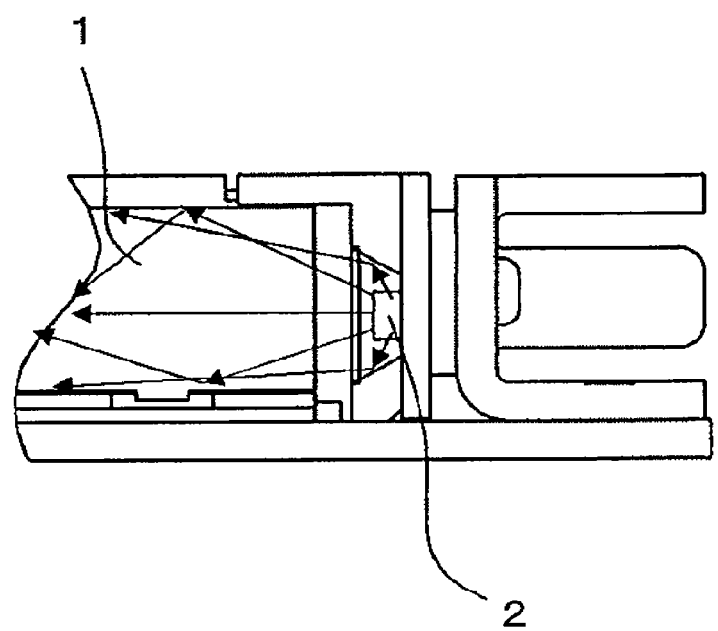
FIG. 31B is a diagram illustrating an optical path in the longitudinal cross section of the vicinity of the end of the light source device according to the ninth embodiment.
Figure 32:
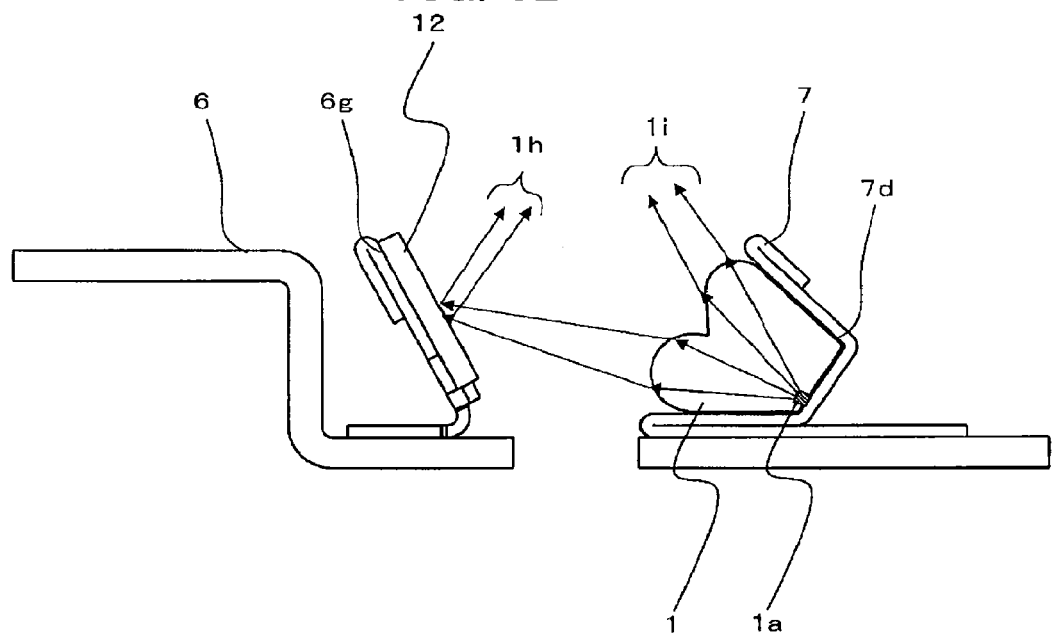
FIG. 32 is a diagram illustrating an optical path in the transverse cross section of the light source device according to the ninth embodiment.

FIG. 26 is an exploded view illustrating the structure of the bifurcated linear light source device according to the ninth embodiment of the present disclosure. FIG. 27 is an exploded view illustrating a light source part of the bifurcated linear light source device according to the ninth embodiment of the present disclosure. FIG. 28 is a top view of the bifurcated linear light source device according to the ninth embodiment of the present disclosure. FIG. 29A is a cross-sectional view of the vicinity of the longitudinal end of the bifurcated linear light source device according to the ninth embodiment of the present disclosure. FIG. 29B is a longitudinal sectional view of the bifurcated linear light source device according to the ninth embodiment of the present disclosure. FIG. 30A is a development view of a plate-like member constituting a housing according to the ninth embodiment of the present disclosure. FIG. 30B is a development view of a plate-like member constituting a light guide holder according to the ninth embodiment of the present disclosure. FIG. 30C is a development view of a plate-like member constituting a mirror mounting surface according to the ninth embodiment of the present disclosure. FIG. 31A is a diagram illustrating an optical path in the longitudinal cross section of the bifurcated linear light source device according to the ninth embodiment of the present disclosure. FIG. 31B is a diagram illustrating an optical path in the longitudinal cross section of the vicinity of the end of the bifurcated linear light source device, or the vicinity of a light emitter, according to the ninth embodiment of the present disclosure. FIG. 32 is a diagram illustrating an optical path in the transverse cross section of the bifurcated linear light source device according to the ninth embodiment of the present disclosure.

The structure and operation of the bifurcated linear light source device according to the ninth embodiment are described with reference to FIGS. 26 to 32. The light guide 1 is, as described in the first embodiment, a rod-shaped member formed of a transparent resin and extending in the longitudinal direction, and has a light diverting surface 1*a* along the entire longitudinal extent and curved exit portions 1*b* and 1*c*.

A mirror (reflector) 12 is arranged in parallel to the light guide 1 in the longitudinal direction, reflects primary light 1*h* emitted from the light guide 1, and emits the reflected secondary light in the direction of a document mount. The mirror 12 is constructed of, for example, a metallized surface, and has a thin plate-like or sheet-like form extending in the longitudinal direction. The mirror 12 is fixed on the mirror mounting surface 6*g* of a housing 6, by adhesion or the like, and is maintained at appropriate distance and angle with respect to the light guide 1 and the document mount.

A light emitter 2 is a light source element such as a light emitting diode (LED) light source and is fixed on a light emitter mounting board 4 by soldering or the like. The light emitter 2 is driven with current by the light emitter mounting board 4 to emit light. The light emitter 2 emits light and the light enters the light guide 1 from one longitudinal end surface thereof.

A light emitter 3 is a light source element such as an LED light source and is fixed on a light emitter mounting board 5 by soldering or the like. The light emitter 3 is driven with current by the light emitter mounting board 5 to emit light. The light emitter 3 emits light and the light enters the light guide 1 from an end surface thereof at the opposite side to the light emitter 2 side of the light guide 1.

An optical filter 10 is a member that uses glass or polyethylene terephthalate (PET) resin sheet as a base material so as to alter optical properties. The optical filter 10 is a filter that obtains excitation light using, for example, phosphors or the like, or a band-pass filter or the like that removes unnecessary wavelengths. The optical filter 10 is fixed on a holder 8 by adhesion or the like. The optical filter 10 may be disposed between the light emitter 2 and the light guide 1 so as to face the light emitter 2, and the optical filter 10 may be disposed between the light emitter 3 and the light guide 1 so as to face the light emitter 3.

The holder 8 retains the light emitter mounting board 4, the optical filter 10, and a fin 9 and eliminates or reduces unintended light from the light emitters 2 and 3 and the light guide 1. An end portion including one end surface of a light guide holder 7 may be inserted into one longitudinal end surface of the holder 8. At the opposite side of the end surface of the holder 8 in the longitudinal direction, the light emitter mounting board 4 and the light emitter 2 may be disposed so as to face the light guide 1. In addition, an end portion including one end surface of the light guide holder 7 is inserted into the one longitudinal end surface of the holder 8, and at the opposite side of the end surface of the holder 8 in the longitudinal direction, the light emitter mounting board 5 and the light emitter 3 may be disposed so as to face the light guide 1.

The holder 8 has a face for retaining the optical filter 10 at the side where the end portion of the light guide holder 7 is inserted. The holder 8 has, on the opposite face thereto, a face for fixing the light emitter mounting board 4 or 5. The holder 8 has an opening equivalent in size to the light emitter 2 on the face for fixing light emitter mounting board 4. The face for retaining the optical filter 10 has an opening equivalent in size to the light guide 1. In addition, the holder 8 has an opening equivalent in size to the light emitter 3 on the face for fixing the light emitter mounting board 5. The face for retaining the optical filter 10 has an opening equivalent in size to the light guide 1.

In other words, when the light emitter 2 or 3 has sufficiently smaller area than the area of the end surface of the light guide 1, the holder 8 has a tapered structure. A portion corresponding to the open side of a groove portion of the light guide holder 7 as described below is shaped so as to project toward the light guide 1 side, compared to the other portions.

The light guide holder 7 is formed of a thin plate, such as a metal plate, having a high light reflectivity, and has a groove portion 7d formed as a long groove in the longitudinal direction. The light guide 1 is disposed in the groove portion 7d and retained therein in the longitudinal direction. The open side of the groove portion 7d is an exit portion for light to exit from the light guide 1.

The light guide holder 7 includes light guide retention holes 7a to 7c. The light guide retention hole 7a is formed on the bottom surface inside the long groove at the longitudinal central part. The light guide retention hole 7b is formed on the inner surface at the open side between the longitudinal central part and the longitudinal end. The light guide retention hole 7c is formed on the inner surface at the open side between the longitudinal central part and the longitudinal end opposite to the light guide retention hole 7b.

The light guide holder 7 retains the light guide 1 at an appropriate position with respect to the mirror 12 and the housing 6, and can return leakage light from the side surface thereof and the rear side of the light diverting surface 1a back into the light guide 1. This eliminates or reduces emission of unintended light from other than the exit portions 1b and 1c.

In addition, the light guide holder 7 is folded along the longitudinal direction by hemming or the like, at the open side of the long groove thereof for retaining the light guide 1. This processing makes the cut surface of the sheet metal less visible from the open side.

The housing 6 is formed of a sheet metal having a high workability such as an iron material and aluminum material. Folding the plate-like member inwardly at the locations illustrated by chain double-dashed lines in FIG. 30 forms a boat-shaped housing 6.

In other words, the plate-like member is folded inwardly at one long side of the rectangular bottom to form a long side wall portion. The plate-like member is also folded inwardly at the other long side of the bottom so as to form a predetermined angle with respect to the transverse direction of the bottom. In addition, the plate-like member is folded inwardly at the short side of the bottom to form a short side wall portion. The order of folding may be varied as appropriate. Such folding of the plate-like member forms the housing 6. The long side wall portion of the housing 6 is folded by hemming or the like, and this processing makes the cut surface of the sheet metal less visible from the open side.

The housing 6 includes retention holes (light guide holder retention holes) 6a, 6b and 6c. The retention hole 6a is formed on the bottom surface at the longitudinal central part. The retention hole 6b is formed on the bottom surface between the retention hole 6a and the end. The retention hole 6c is formed on the bottom surface between the retention hole 6a and the end at the opposite side to the retention hole 6b side.

The housing 6 further includes an aperture 6d formed on the bottom surface along the longitudinal direction and an illumination device mounting hole 6e. The light guide holder 7 and the mirror 12 are thus fixed in the longitudinal, transverse, and vertical directions.

The retention hole 6a is a round hole disposed on the bottom surface of the housing 6. The retention hole Ca is disposed at the longitudinal central part between the aperture 6d and a light guide holder retainer 6f in the transverse direction. Insertion of a pin 7e of the light guide holder 7 into the retention hole 6a enables the position of the light guide holder 7 to be fixed in the longitudinal and transverse directions.

The retention hole 6b is a longitudinally elongated hole disposed on the bottom surface of the housing 6. The retention hole 6b is disposed at one longitudinal end between the aperture 6d and the longitudinal side surface of the housing 6 in the transverse direction. Insertion of a pin 7f of the light guide holder 7 into the retention hole 6b enables the position of the light guide holder 7 to be fixed in the longitudinal and transverse directions.

The retention hole 6c is a longitudinally elongated hole disposed on the bottom surface of the housing 6. The retention hole 6c is provided at the other longitudinal end of the opposite side to the retention hole 6b side between the aperture 6d and the longitudinal side surface of the housing 6 in the transverse direction. Insertion of a pin 7g of the light guide holder 7 into the retention hole 6c enables the position of the light guide holder 7 to be fixed in the longitudinal and transverse directions.

The aperture 6d is a hole formed along the longitudinal direction of the bottom surface of the housing 6. The aperture 6d allows image information of an object to be read (scattered light reflected by the object irradiated with light) to be transmitted therethrough to an imager (lens and image sensor), so that unnecessary light other than the image information is eliminated or reduced.

The illumination device mounting holes 6e are holes, provided at both of the longitudinal ends of the bottom surface of the housing 6, for fixing the light source device to a reader device.

The mirror mounting surface 6g is a member for retaining the mirror 12. The mirror mounting surface 6g extends in the longitudinal direction and is provided transversely outside the aperture 6d. The mirror mounting surface 6g enables precise retention of the mirror 12 at any angle.

If that the mirror mounting surface 6g is provided so as to be directly continuous with the bottom surface of the housing 6, the mirror mounting surface 6g defining an angle for mounting the mirror 12 is too close to the aperture 6d, so that fabrication with sufficient precision becomes difficult. The mirror mounting surface 6g according to the present embodiment is not provided so as to be directly continuous with the bottom surface of the housing 6, but is mounted on the surface folded from the bottom surface of the housing 6. This thus enables the mirror mounting surface 6g to retain the mirror 12 with precision.

The mirror mounting surface 6g does not extend over the entire length, and a surface that is adjacent to the housing bottom surface, on which the mirror mounting surface 6g is not provided, and is located at the mirror mounting surface 6g side with respect to the aperture 6d, is folded vertically from the housing bottom surface, thereby enhancing the strength of the housing. The surface may be also folded in the direction opposite to the bottom surface to form a mount surface of the light source device. The mirror mounting surface 6g has an area enough for the mirror 12 not to sag; specifically, the optimal area and arrangement of the mirror mounting surface 6g vary depending on the weight and stiffness of the mirror 12.

The fin 9 is fixed to the holder 8 together with the light emitter mounting board 4 and a heat conductor 15 by inserting a screw 13 into a holder retention hole 6j provided between the aperture 6d and the illumination device mounting hole 6e in the longitudinal direction of the housing 6, as illustrated in FIG. 29A. The light emitter mounting board 4 may be fixed to the heat conductor 15 by, for example, glues, adhesives, or the like.

The light guide holder 7 is a member for retaining the light guide 1. The light guide holder 7 eliminates or reduces leaking of light emitted from the light emitters 2 and 3 and light exiting from the light guide 1 to the outside of the light source device from unintended locations.

The light guide holder 7 is formed of a thin plate material and fixed to the housing 6 by crimping, adhesive bonding, or the like. The light guide holder 7 has a length less than the full length of the housing 6, and the light guide holder 7 and the holder 8 face their respective end surfaces. The gap between the end surfaces in the lengthwise of the light guide holder 7 and the holder 8 is sized greater than the extent of elongation of the light guide holder 7 due to its temperature characteristics.

The light guide holder 7 has an opening that exposes the exit portions 1b and 1c of the light guide 1. Both ends of the portions for retaining the light guide 1 are inserted into the holder 8.

The heat conductor 15, which is a member for conducting heat, is made of a material having high adhesivity and thermal conductivity, for example, a silicone sheet or the like. The heat conductor 15 is disposed between the light emitter mounting board 4 and the fin 9 and between the light emitter mounting board 5 and the fin 9.

The fin 9 and the housing 6 cool the light emitters 2 and 3. Specifically, heat generated by the light emitter 2 is conducted through the light emitter mounting board 4 to the heat conductor 15 and the fin 9 and further to the housing 6 to be dissipated throughout the housing 6. Heat generated by the light emitter 3 is conducted through the light emitter mounting board 5 to the heat conductor 15 and the fin 9 and further to the housing 6 to be dissipated throughout the housing 6.

FIG. 31A is a diagram illustrating an optical path in the longitudinal cross section of the entire light source device according to the ninth embodiment. FIG. 31B is a diagram illustrating an optical path in the longitudinal cross section of the vicinity of the end of the light source device according to the ninth embodiment. FIG. 32 is a diagram illustrating an optical path in the transverse cross section of the light source device according to the ninth embodiment of the present disclosure.

A portion of incident light from the light emitters 2 and 3 to the light guide 1 enters the light guide 1 directly, whereas the rest or a portion of the rest of incident light is scattered by the tapered portion of the holder inner wall and then enters the light guide 1, as indicated by an arrow FIGS. 31A and 31B. Light entering the light guide 1 travels longitudinally by repetitive reflection on the wall surface of the light guide 1, and a portion of the light is incident on a white printed pattern or uneven shaped light diverting surface 1a formed along the longitudinal direction of the light guide 1.

Light not incident on the light diverting surface 1a travels longitudinally within the light guide 1 and exits from the end surface opposite to the entry surface. Light exiting from the end is scattered by the tapered portion of the holder 8 and reenters the light guide 1.

Light incident on the light diverting surface 1a is emitted by reflection from the exit portion 1c facing the light diverting surface 1a in the direction of the irradiated part of the document mount as linear secondary light 1i extending longitudinally, as illustrated in FIG. 32.

A portion of the holder 8 corresponding to the open side of the groove of the light guide holder 7 projects to the light guide 1 side, compared to the other portions. Thus very little non-uniform light exits from the light guide 1 at the end of the light guide 1.

On the other hand, a portion of light incident on the light diverting surface 1a exits from the exit portion 1b to the mirror 12 as linear primary light 1h extending longitudinally. Primary light 1h exiting to the mirror 12 is reflected by the mirror 12 and exits in the direction of the irradiated part of the document mount as linear primary light 1h extending longitudinally. In FIG. 32, which is a view of a cross section at the longitudinal central part, the arrows from the light diverting surface 1a of the light guide 1 toward the document mount each indicate a main optical path in which light reflected by the light diverting surface 1a reaches the object to be read.

The bifurcated linear light source device using the light guide 1 according to the first embodiment is described in the ninth embodiment of the present disclosure. However, the bifurcated linear light source device may employ the light guide 1 according to any one of the second to eighth embodiments, instead of the light guide 1 according to the first embodiment. In such a modified example, the light guide 1 is arranged in the bifurcated linear light source device such that secondary light 1i exits toward the mirror 12, so that effects and advantages similar to the present embodiment can be obtained.

Tenth Embodiment

A tenth embodiment of the present disclosure is described with reference to FIGS. 33 to 36. An image reading device using a light guide 1 according to the first embodiment is described in the tenth embodiment.

Figure 33:
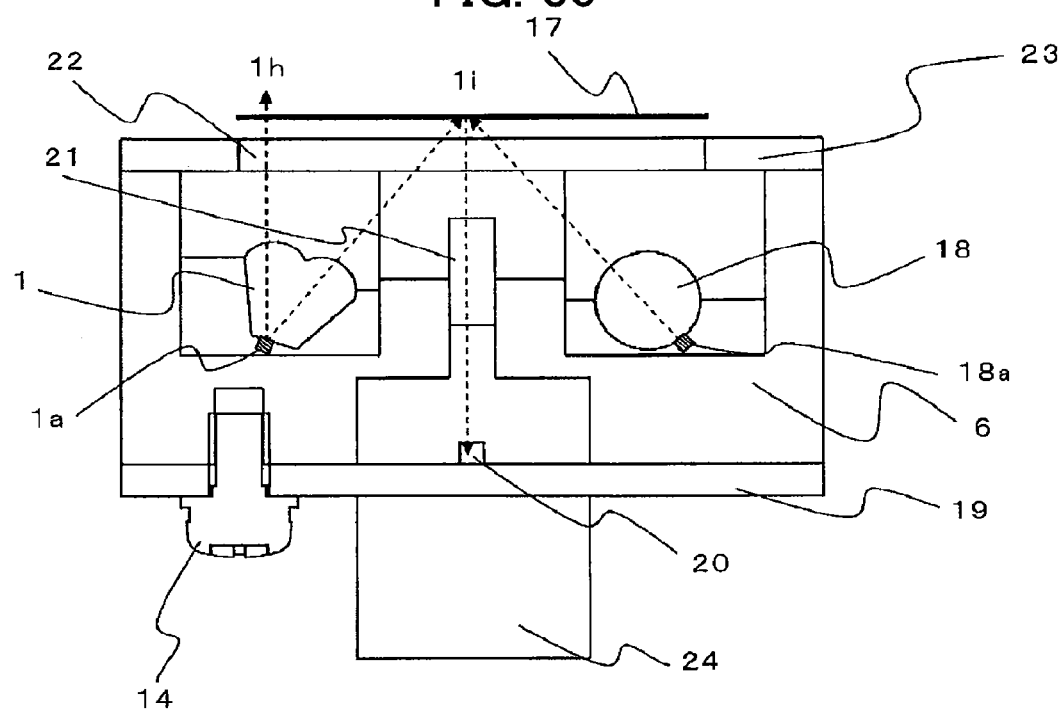
FIG. 33 is a view of a cross section perpendicular to a main scanning direction, of an image reading device using an image sensor according to a tenth embodiment of the present disclosure.
Figure 34:
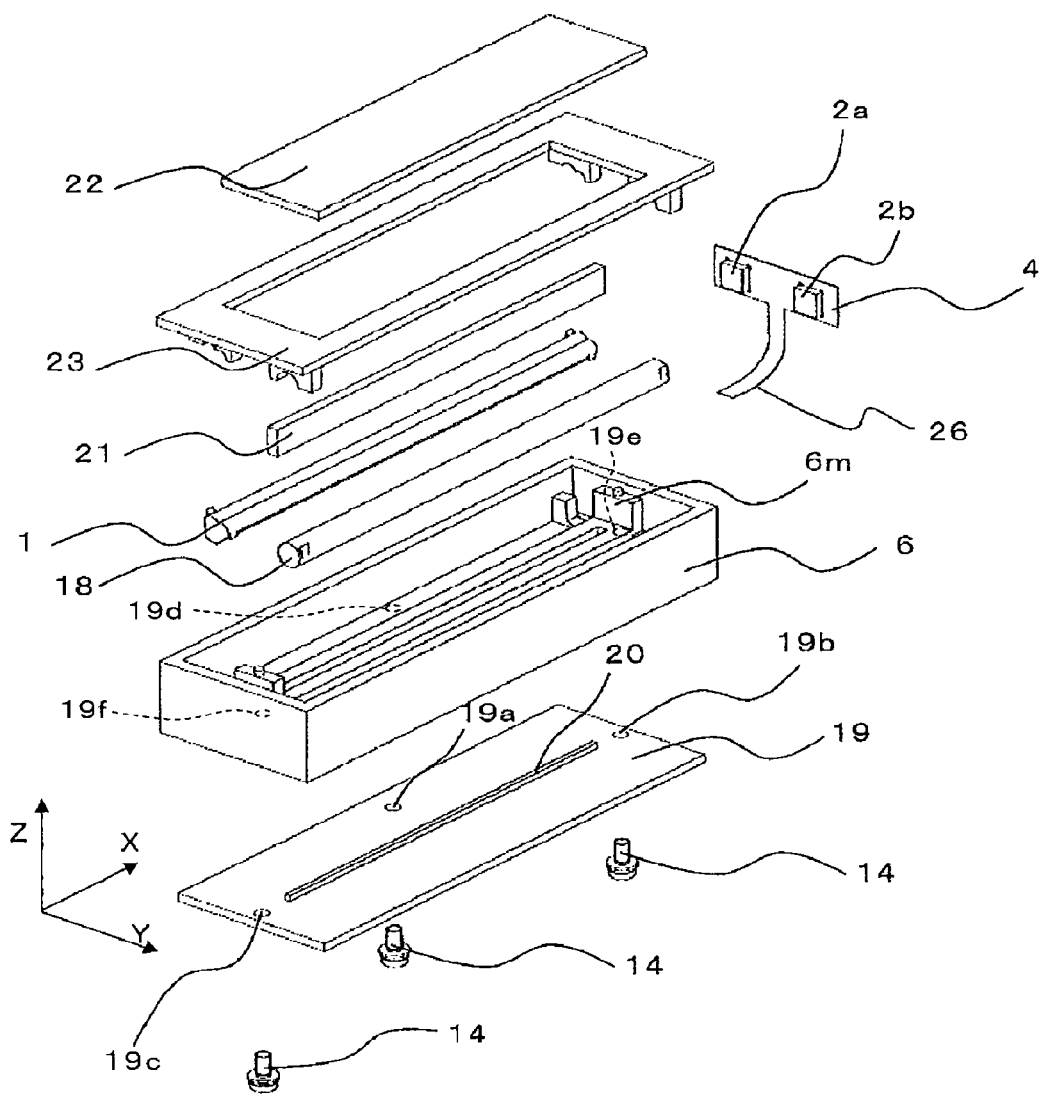
FIG. 34 is an exploded view of the image reading device according to the tenth embodiment.
Figure 35:
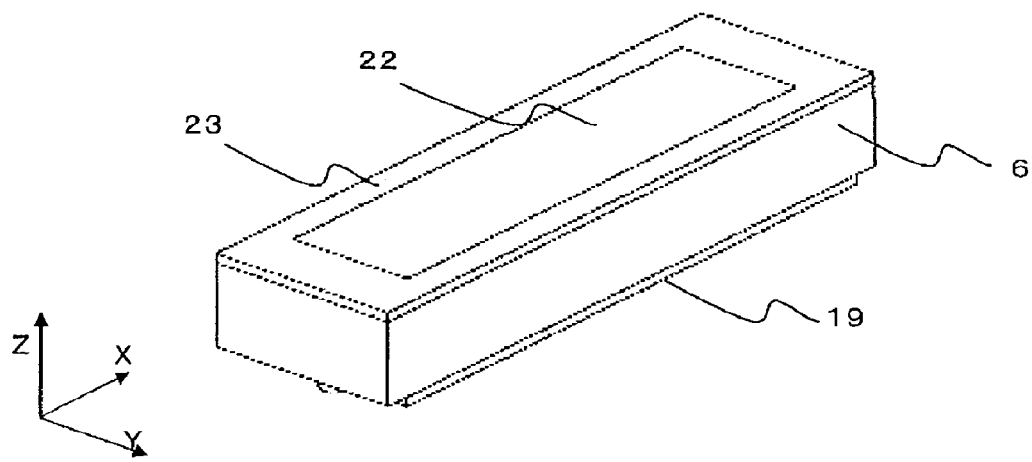
FIG. 35 is an external view with a glass side up of the image reading device according to the tenth embodiment.
Figure 36:
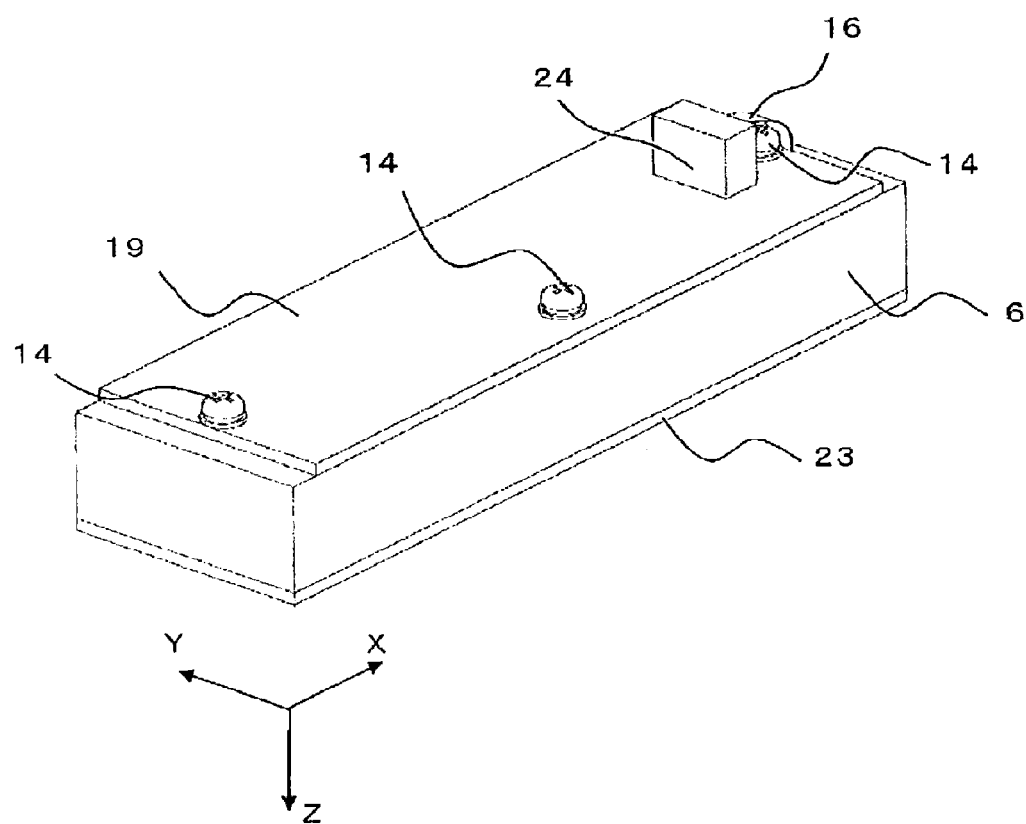
FIG. 36 is an external view with a signal processing board side up of the image reading device according to the tenth embodiment.

FIG. 33 is a view of a cross section perpendicular to a main scanning direction (longitudinal direction), of an image reading device using an image sensor according to the tenth embodiment of the present disclosure. FIG. 34 is an exploded view of the image reading device according to the tenth embodiment of the present disclosure. FIG. 35 is an external view with a glass side up of the image reading device according to the tenth embodiment of the present disclosure. FIG. 36 is an external view with a signal processing board side up of the image reading device according to the tenth embodiment of the present disclosure.

An object to be read (object to be irradiated) 17 is an object placed outside an image sensor. The object to be read 17 is irradiated with exiting light for information of the surface to be read, and typical examples of such an object are paper sheets such as paper money, valuable papers, and checks. The object to be read 17 has, for example, reflected light information indicated by light reflected on the surface thereof, transmitted light information regarding watermarks, or the like.

The light guide 1 is a rod-shaped member formed of a transparent resin and extending in the longitudinal direction, as described in the first embodiment. The light guide 1 has, along the entire longitudinal extent, the light diverting surface 1a and the exit portions 1b and 1c having the curved surfaces. The light guide 1 emits linear light in two directions by linear light emission from each of the exit portions 1b and 1c.

A light guide 18 is a rod-shaped member formed of a transparent resin and extending in the longitudinal direction. The light guide 18 has, along the entire longitudinal extent, a light diverting surface 18a and an exit portion having a curved surface. The light guide 18 emits linear light in one direction by linear light emission from the exit portion.

The light guide 1 irradiates with secondary light 1i the object to be read 17 that is disposed immediately above a rod lens array 21, that is, a read position to be irradiated, as illustrated in FIG. 33. The light guide 1 irradiates a position outside (left side of the drawing) of the read position with primary light 1h.

The light guide 18 irradiates with light the object to be read 17 that is disposed immediately above the rod lens array 21, that is, the read position.

The light emitter 2a is a light source element such as an LED light source and is fixed on a light emitter mounting board 4 by soldering or the like. The light emitter 2a is driven with current by the light emitter mounting board 4 to emit light. The light emitter 2a emits incident light that enters the light guide 1 from the end surface thereof.

The light emitter 2b is a light source element such as an LED light source and is fixed on a light emitter mounting board 4 by soldering or the like. The light emitter 2b is driven with current by the light emitter mounting board 4 to emit light. The light emitter 2b emits incident light that enters the light guide 18 from the end surface thereof.

A cover 23 and a transparent plate 22 have a conveying surface thereon along which the object to be read 17 is conveyed, as illustrated in FIG. 33. If equipment such as copying machines and banking terminals incorporating the image reading device is equipped with one or both of the cover 23 and the transparent plate 22, then the image reading device according to the present disclosure may not have one or both of the cover 23 and the transparent plate 22.

The cover 23 is formed of a resin, metal, or the like and retains the transparent plate 22. The transparent plate 22 is a transparent plate-like member made of a material such as glass and plastic and is fixed to the cover 23 by adhesion or the like. The cover 23 has, on the inner surface, claws for pressing the upper surfaces of the end portions of the light guides 1 and 18, thereby fixing the light guides 1 and 18 transversely and vertically.

A housing 6 is composed of a frame. The housing 6 has a portion for supporting the cover 23 formed in the edge portion of one opening of the housing 6 along at least the X-direction, as illustrated in FIG. 35. The housing 6 has a groove therein for retaining the rod lens array 21. The rod lens array 21 is fixed longitudinally, transversely, and vertically to the housing 6 by adhesion or the like.

In addition, the housing 6 has, on the inner surface, claws for holding the lower surfaces of the end portions of the light guides 1 and 18, and fixing the light guides 1 and 18 transversely and vertically. The housing 6 retains the light guides 1 and 18, the rod lens array 21, the light emitter mounting board 4, the cover 23, and a signal processing board 19.

The rod lens array (imaging optical system) 21 extends longitudinally and is fixed to the housing 6. The rod lens array 21 is disposed between the light guides 1 and 18 in the transverse direction (the Y-axis direction in FIG. 34 and the left-right direction in FIG. 37). The rod lens array 21 is disposed parallel to the light guides 1 and 18 in the longitudinal direction (the X-axis direction in FIG. 34). The rod lens array 21 images, on a sensor IC 20, light emitted from the light guides 1 and 18 and reflected by the object to be read.

The sensor IC (light receiver) 20 is a solid state image sensor such as a CMOS and CCD. The sensor IC 20 is fixed on the signal processing board 19 by die bonding or the like, and electrically connected to other elements by wire bonding or the like. The sensor IC 20 is disposed so as to extend in parallel to the rod lens array 21. The sensor IC 20 is driven by the signal processing board 19 and converts (photoelectrically converts) light information incident through the rod lens array 21 into an electrical signal.

The signal processing board 19 is mechanically and electrically connected to the sensor IC 20 and fixes and drives the sensor IC 20. The signal processing board 19 is provided with a connector 24. The drive power is supplied via the connector 24 to the signal processing board 19. The signal processing board 19 transmits an electrical signal via the connector 24. The signal processing board 19 drives the light emitters 2 and 3 via the connector 24. The connector 24 is divided into multiple sections depending upon the particular application (use for sensor driving, LED driving) and the like.

The signal processing board 19 has insertion holes 19a, 19b, and 19c, as illustrated in FIG. 34. The signal processing board 19 is fixed longitudinally, transversely, and vertically by fastening members such as screws inserted into each of board mounting holes 19d, 19e, and 19f provided on the bottom of the housing 6. The insertion hole 19a of the signal processing board 19 and the board mounting hole 19d of the housing 6 are provided on the same line in the vertical direction of the sensor IC 20 (the Z-axis direction in FIG. 34) and at the center of the sensor IC 20 in the longitudinal direction (the X-axis direction in FIG. 34). The insertion holes 19b and 19c of the signal processing board 19 and the board mounting holes 19e and 19f of the housing 6 are provided on the same line in the vertical direction of the sensor IC 20 (the Z-axis direction in FIG. 34) and in extension of the sensor IC 20 in the longitudinal direction (the X-axis direction in FIG. 34). Providing the fastening portions (insertion holes 19b and 19c and board mounting holes 19e and 19f) in such locations enables the relative position between the rod lens array 21 and the sensor IC 20 to be determined with high precision.

The light emitter mounting board 4, on which the light emitters 2a and 2b are mounted, has a harness 26. The light emitter mounting board 4 is disposed so that the surface opposite to the mount surface, on which the light emitters 2a and 2b are mounted, is in contact with the light source board contact surface 6m provided inside the housing 6 along the main scanning direction. The harness 26 passes through the insertion hole 19a, 19b, or 19c of the housing 6 and is connected to the connector 24 that is mounted on the signal processing board 19.

The rod lens array 21 is an example of imaging optical system for converging light emitted from the light guides 1 and 18 and reflected by the object to be read 17. The rod lens array 21 is an optical member; for example, a lens array for converging light on a line sensor (sensor array) such as a rod lens array and macro-lens array, or a composite of optical members; for example, a lens or mirror constituting an image sensor (image reading device) of a reduction optical system.

The tenth embodiment of the present disclosure is described with the rod lens array 21. The rod lens array is configured such that multiple erect unity magnification rod lenses are arranged in the main scanning direction of the image sensor and fixed with a frame or the like. For simplicity, however, only a box-shaped contour elongated in the main scanning direction is illustrated in the tenth embodiment of the present disclosure. In addition, the focal point of the rod lens array 21 is adjusted to be located on the surface on which the object to be read is positioned (or the surface for conveying the object to be read, for a case in which the object to be read is conveyed).

The signal processing board 19 is a circuit board having a sensor IC 20 mounted thereon and has a connector (not illustrated) to allow external connection. The sensor IC 20, which receives light converged by the rod lens array 21 and photoelectrically converts the received light, is mounted on the signal processing board 19 so as to be arranged only along the reading length in the main scanning direction. In addition, the connector provides the electrical signal photoelectrically converted by the sensor IC (sensor IC 20) of the signal processing board 19 to the outside as an image signal.

The signal processing board 19 is fixed on the other opening surface of the housing 6 by fixing means such as screws. The fixing means are not limited to screws, but may include pins, rivets, or the like. In addition, the other opening side of the housing 6 may also have a stepped portion similar to the shorter inner length stepped portion of the one opening side of the housing 6 as described above, that is, the other opening side of the housing 6 also has a stepped portion having a shorter inner length. The signal processing board 19 may be fixed by fitting into the stepped portion. Another fixing means such as the above described screws and any other attachment may be employed.

Light entering the light guide 1 from the end surface thereof propagates within the light guide 1 longitudinally, and is reflected by the light diverting surface 1*a* in a direction, for example, any of directions perpendicular to the longitudinal direction, and exits as primary light 1*h* or secondary light 1*i*. Light entering the light guide 18 from the end surface thereof propagates within the light guide 18 longitudinally, and is reflected by the light diverting surface 18*a* in a direction, for example, any of directions perpendicular to the longitudinal direction, and exits in the irradiation direction of secondary light 1*i* of the light guide 1. Secondary light 1*i* from the light guide 1 and light from the light guide 18 are reflected by the object to be read 17 and are made to converge by the rod lens array 21 to be imaged onto the sensor IC 20. Primary light 1*h* from the light guide 1 irradiates an area different from the area of the object to be read 17 irradiated with secondary light 1*i* and is transmitted through the object to be read 17. Use of the light guide 1 thus enables the image reading device to irradiate two different areas.

The tenth embodiment of the present disclosure is described for an image reading device using the light guide 1 of the first embodiment. However, the image reading device may employ the light guide 1 according to any one of the second to eighth embodiments, instead of the light guide 1 according to the first embodiment. In such a modified example, the light guide 1 is arranged in the image reading device such that primary light and secondary light are emitted similarly to the light guide 1 according to the tenth embodiment, so that effects and advantages similar to the present embodiment can be obtained.

Eleventh Embodiment

An image reading device according to an eleventh embodiment of the present disclosure is described with reference to FIG. 37. An image reading device using the light guide according to the first embodiment is described in the eleventh embodiment.

Figure 37:
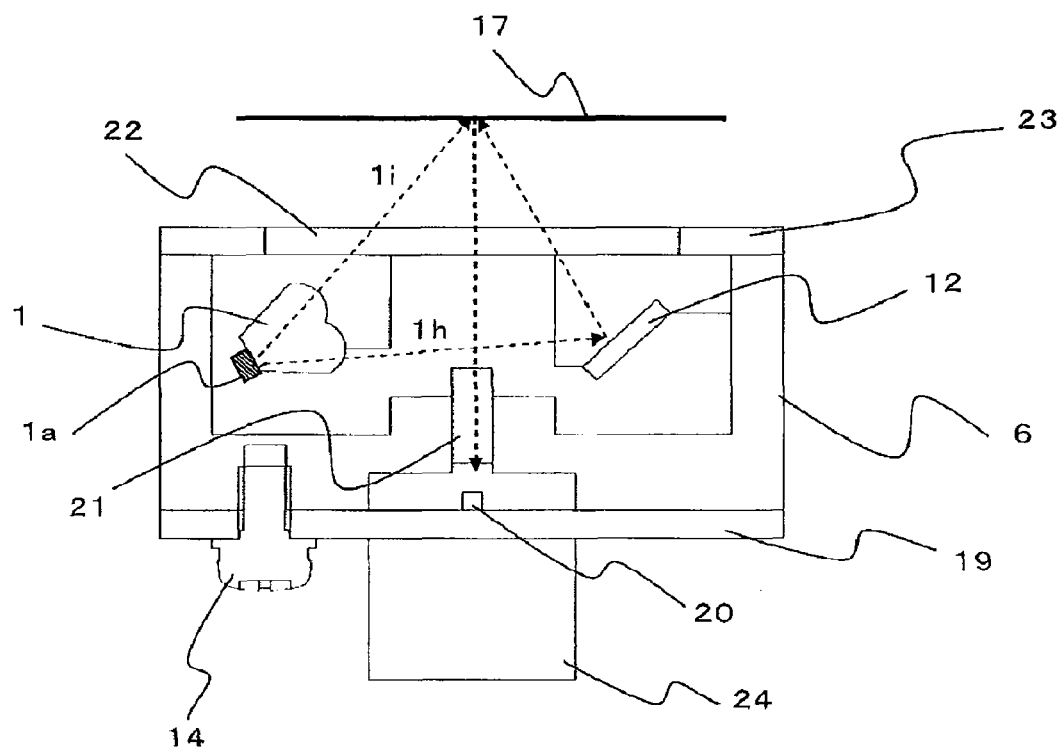
FIG. 37 is a view of a cross section perpendicular to a main scanning direction, of an image reading device using an image sensor according to an eleventh embodiment of the present disclosure.

FIG. 37 is a view of a cross section perpendicular to a main scanning direction, of an image reading device using an image sensor according to the eleventh embodiment of the present disclosure. In FIG. 37, same reference signs denote the same or similar components to those in FIGS. 32 and 33, and further descriptions thereof are omitted here.

Light entering a light guide 1 from the end surface thereof propagates within the light guide 1 longitudinally, and is reflected by the light diverting surface 1*a* in a direction, for example, any one of directions perpendicular to the longitudinal direction, and exits as primary light 1*h* or secondary light 1*i*. An object to be read 17 is directly irradiated with secondary light 1*i*. Primary light 1*h* is reflected by a mirror 12, and the object to be read 17 is irradiated with the reflected primary light 1*h* from the side opposite to secondary light 1*i* side with respect to a rod lens array 21. Primary light 1*h* and secondary light 1*i* exiting from the light guide 1 and irradiating the object to be read 17 are reflected by the object to be read 17 and are made to converge by the rod lens array 21 to be imaged on a sensor IC 20.

The present embodiment can provide the image reading device that enables a single light guide 1 to irradiate the object to be read 17 with light from two different directions.

The eleventh embodiment of the present disclosure is described for an image reading device using the light guide 1 according to the first embodiment of the present disclosure, but the image reading device may employ the light guide 1 according to any one of the second to eighth embodiments of the present disclosure. Also in this case, the light guide 1 is arranged in the image reading device such that primary light and secondary light are emitted similarly to the light guide 1 according to the eleventh embodiment, so that effects and advantages similar thereto can be obtained.

Although the foregoing describes some example embodiments and modified examples of the present disclosure, the present disclosure is not limited thereto. The present disclosure has any appropriate combination of the embodiments and modified examples, and modifications added thereto as appropriate.

REFERENCE SIGNS LIST

1 Light guide
1*a* Light diverting surface (reflecting portion)
1*b* Exit portion (first exit portion)
1*c* Exit portion (second exit portion)
1*d*, 1*e*, 1*f*, 1*n*, 1*r* Side surface
1*g* Entry surface
1*h* Primary light (first exiting light)
1*h'* Optical path
1*i* Secondary light (second exiting light)
1*k*, 1*m* Bottom surface (plane)
1L Light diverting surface (reflecting portion)
1*p*, 1*q* Notch (recess)
2, 2*a*, 2*b*, 3 Light emitter
4, 5 Light emitter mounting board
6 Housing
6*a*, 6*b*, 6*c* Retention hole
6*d* Aperture
6*e* Illumination device mounting hole
6*f* Light guide holder retainer
6*g* Mirror mounting surface
6*j* Holder retention hole
7 Light guide holder (light guide case)
7*a*, 7*b*, 7*c* Light guide retention hole
7*d* Groove portion 7e, 7f, 7g Pin
8 Holder
9 Fin
10, 11 Optical filter
2 Mirror
13, 14 Screw
15 Heat conductor
16 Harness
17 Object to be read
18 Light guide
18a Light diverting surface (reflecting portion)
19 Signal processing board
19a, 19b, 19c Insertion hole
19d, 19e, 19f Board mounting hole
20 Sensor IC
21 Rod lens array (imaging optical system)
22 Transparent plate
23 Cover
24 Connector
26 Harness
30 Light blocking member
110, 111 Circle of light guide 1

The invention claimed is:

1. A light guide extending in a long axis direction and having an end in the long axis direction from which light enters the light guide, the light guide comprising:
   a first exit portion having a first curved surface having a convex cross section perpendicular to the long axis direction, and emitting first exiting light;
   a second exit portion having a second curved surface having a convex cross section perpendicular to the long axis direction, being connected to the first exit portion in a direction perpendicular to the long axis direction, and emitting second exiting light in a direction different from a direction of the first exiting light;
   a first reflecting portion disposed in a first plane portion facing the first exit portion;
   a second reflecting portion disposed in a second plane portion facing the second exit portion; and
   at least one recess of:
      a recess extending in the long axis direction and disposed between the first exit portion and the second reflecting portion; and
      a recess extending in the long axis direction and disposed between the second exit portion and the first reflecting portion,
   the at least one recess being formed by planes extending in the long axis direction and intersecting each other,
   the at least one recess being formed by a plane parallel to an optical axis of the first exiting light and by a plane intersecting the plane parallel to the optical axis of the first exiting light.

2. The light guide according to claim 1, wherein the intersection angle between the planes forming the at least one recess is 90 degrees.

3. The light guide according to claim 1, wherein the intersection angle between the planes forming the at least one recess is an obtuse angle.

4. The light guide according to claim 1, further comprising a light blocking member disposed in a corresponding one of the at least one recess.

5. A light guide extending in a long axis direction and having an end in the long axis direction from which light enters the light guide, the light guide comprising:
   a first exit portion having a first curved surface having a convex cross section perpendicular to the long axis direction, and emitting first exiting light;
   a second exit portion having a second curved surface having a convex cross section perpendicular to the long axis direction, being connected to the first exit portion in a direction perpendicular to the long axis direction, and emitting second exiting light in a direction different from a direction of the first exiting light;
   a first reflecting portion disposed in a first plane portion facing the first exit portion;
   a second reflecting portion disposed in a second plane portion facing the second exit portion; and
   at least one recess of:
      a recess extending in the long axis direction and disposed between the first exit portion and the second reflecting portion; and
      a recess extending in the long axis direction and disposed between the second exit portion and the first reflecting portion,
   the at least one recess being formed by planes extending in the long axis direction and intersecting each other,
   the recess disposed between the first exit portion and the second reflecting portion being formed by a plane parallel to an optical axis of the first exiting light and by a plane intersecting the plane parallel to the optical axis of the first exiting light, and
   the recess disposed between the second exit portion and the first reflecting portion being formed by a plane parallel to an optical axis of the second exiting light and by a plane intersecting the plane parallel to the optical axis of the second exiting light.

6. The light guide according to claim 5, wherein the intersection angle between the planes forming the at least one recess is 90 degrees.

7. The light guide according to claim 5 wherein the intersection angle between the planes forming the at least one recess is an obtuse angle.

8. The light guide according to claim 5, further comprising a light blocking member disposed in a corresponding one of the at least one recess.

* * * * *